US012515473B2

(12) United States Patent
Eguchi et al.

(10) Patent No.: US 12,515,473 B2
(45) Date of Patent: Jan. 6, 2026

(54) IMAGE FORMING APPARATUS AND BOOKLET PRODUCING METHOD

(71) Applicant: CANON KABUSHIKI KAISHA, Tokyo (JP)

(72) Inventors: Hiroki Eguchi, Kanagawa (JP); Kenji Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/739,497

(22) Filed: Jun. 11, 2024

(65) Prior Publication Data

US 2025/0001792 A1 Jan. 2, 2025

(30) Foreign Application Priority Data

Jun. 29, 2023 (JP) ................................ 2023-106857

(51) Int. Cl.

*B42C 9/00* (2006.01)
*B42C 1/12* (2006.01)
*G03G 15/00* (2006.01)
*G03G 15/01* (2006.01)

(52) U.S. Cl.

CPC .............. *B42C 9/0081* (2013.01); *B42C 1/12* (2013.01); *G03G 15/0126* (2013.01); *G03G 15/6544* (2013.01); *G03G 15/6585* (2013.01); *G03G 2215/00835* (2013.01); *G03G 2215/00848* (2013.01); *G03G 2215/00936* (2013.01)

(58) Field of Classification Search

CPC ........... B42C 9/0081; B42C 9/00; B42C 1/12; G03G 15/0126; G03G 15/01; G03G 15/6544; G03G 15/00; G03G 15/6585; G03G 2215/00835; G03G 2215/00848; G03G 2215/00936

USPC .......... 412/1, 6, 8, 9, 11, 14, 22, 25, 33, 37, 412/901, 902

See application file for complete search history.

(56) References Cited

U.S. PATENT DOCUMENTS

2008/0176153 A1* 7/2008 Jeong .................. G03G 9/0821 430/48
2013/0051886 A1* 2/2013 Watanabe .......... G03G 15/6544 399/409
2024/0239624 A1 7/2024 Toda et al.

FOREIGN PATENT DOCUMENTS

JP 2004-209858 A 7/2004
JP 2023-51791 A 4/2023

OTHER PUBLICATIONS

Extended European Search Report in European Application No. 24182754.2 (Nov. 2024).

* cited by examiner

*Primary Examiner* — Justin V Lewis
(74) *Attorney, Agent, or Firm* — Venable LLP

(57) ABSTRACT

An image forming apparatus at least comprising: first image forming means for forming a first adhesive layer of a first toner on a sheet; and second image forming means for forming a second adhesive layer of a second toner on the first adhesive layer, adhesive image patterns are formed from the first and the second adhesive layer, the image forming apparatus further comprising specific booklet bonding means, wherein at least both the first and the second adhesive layer are formed on one of a first sheet and a second sheet that face each other in the sheet bundle, at least the first adhesive layer is formed on the other of the first sheet and the second sheet, and G1>G2 is satisfied, where G1 denotes a storage elastic modulus of the first toner, and G2 denotes a storage elastic modulus of the second toner.

15 Claims, 13 Drawing Sheets

Fig. 7C
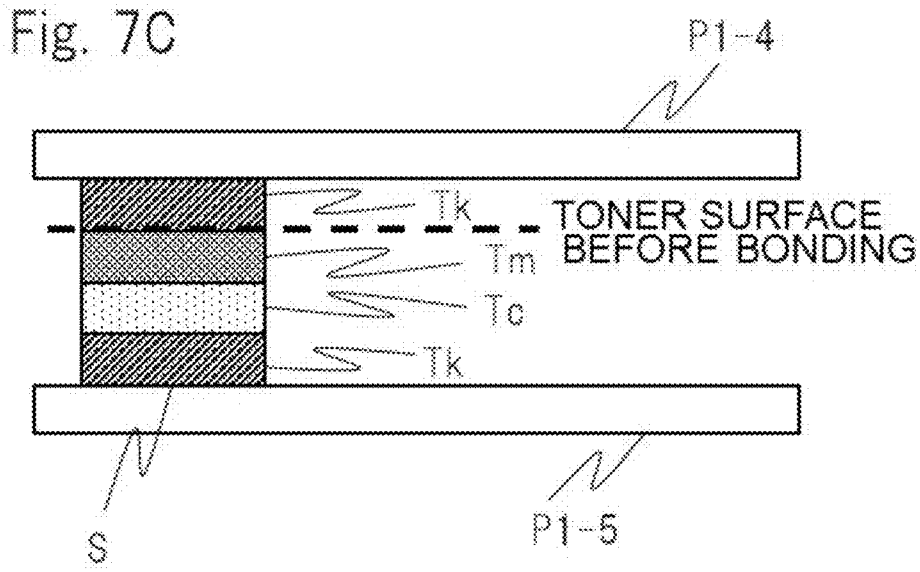
Fig. 8A EXAMPLE 1
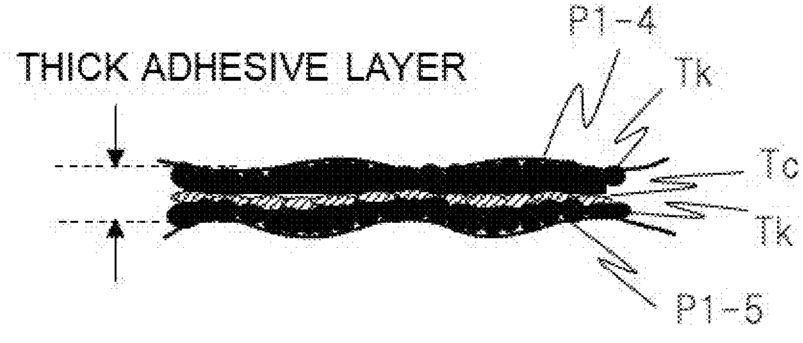
ADHESIVE LAYER IS LESS LIKELY TO PENETRATE SHEET
THERE ARE A SMALL NUMBER OF VOIDS AT INTERFACE BETWEEN TONERS Fig. 8B COMPARATIVE EXAMPLE 1
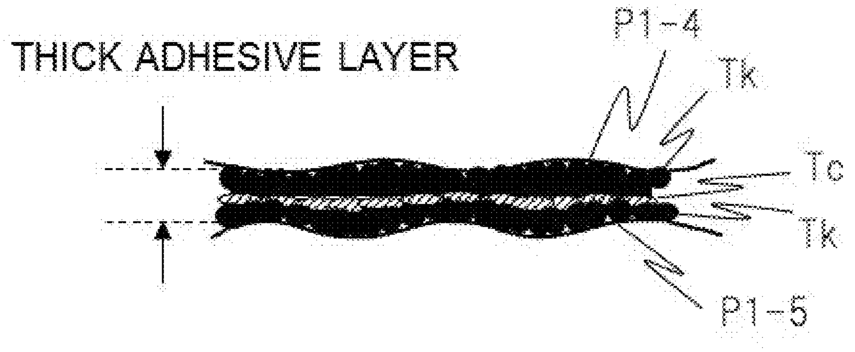
ADHESIVE LAYER IS LESS LIKELY TO PENETRATE SHEET
THERE ARE A LARGE NUMBER OF VOIDS AT INTERFACE BETWEEN TONERS
Fig. 8C COMPARATIVE EXAMPLE 2
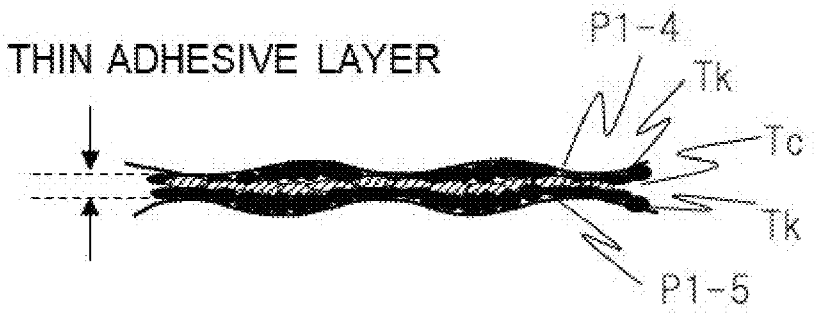
ADHESIVE LAYER IS LIKELY TO PENETRATE SHEET

IMAGE FORMING APPARATUS AND BOOKLET PRODUCING METHOD

BACKGROUND OF THE INVENTION

Field of the Invention

The present disclosure relates to an image forming apparatus using an electrophotographic recording system, such as a laser printer, a copier, or a facsimile, and a booklet producing method, which are applicable to the production of adhesive printed matter such as a booklet.

Description of the Related Art

There is a known method for producing a booklet by using a booklet producing apparatus, which is a post-processing apparatus, to re-melt toner on sheets of a sheet bundle formed of a plurality of sheets that have undergone image forming processing performed by an image forming apparatus such as a printer or a copier, thereby bonding the sheets together. When such a booklet producing apparatus is installed in an image forming apparatus that forms color images using a plurality of colors of toner, one color of toner is usually determined in advance as the toner used to form adhesive toner layers.

However, if the adhesive toner layers are formed using only one color of toner, the amount of adhesive toner consumed will be large compared to other colors of toner. Therefore, for example, Japanese Patent Application Publication No. 2004-209858 proposes a configuration in which a plurality of colors of toner of an image forming apparatus that forms a color image are used to form adhesive toner layers so that an increase in the consumption of a specific color of toner is avoided.

SUMMARY OF THE INVENTION

However, the authors' investigation revealed that when a plurality of toners are used to form adhesive toner layers in the production of a booklet as described above, the bonding strength of the produced booklet may not be sufficient. In the case where a plurality of toners were used to form adhesive toner layers, sufficient booklet bonding strength could not be achieved depending on the physical properties of the toners used in the adhesive layers and the stacking order in each toner layer.

In order to ensure sufficient bonding strength of the booklet, it is considered necessary to ensure that the thickness of each adhesive toner layer is no less than a certain level and that there are a smaller number of voids between the toner layers. If the thickness of the adhesive toner layers is small, it is likely that there will be localized areas where no toner layer is present. As a result, the bonding strength is reduced because the adhesive area is reduced whereby delamination is more likely to occur at the interface between the sheet and the toner layers. In addition, the voids between the toner layers serve as a starting point for adhesion breakage. As a result, the adhesive toner layers are prone to cohesive breakdown. This results in reduced bonding strength.

The present disclosure is directed to an image forming apparatus and a booklet producing method that can achieve desirable booklet bonding strength even when an image pattern for adhesion is formed using a plurality of toner layers.

At least one aspect provides an image forming apparatus at least comprising:

first image forming means for forming a first adhesive layer of a first toner on a sheet; and second image forming means for forming a second adhesive layer of a second toner on the first adhesive layer, adhesive image patterns are formed from the first adhesive layer and the second adhesive layer, the image forming apparatus further comprising booklet bonding means for stacking a plurality of sheets to form a sheet bundle, and applying heat and pressure to the sheet bundle so that the sheets are bonded to each other with the adhesive image patterns interposed therebetween, to form a booklet, wherein at least both the first adhesive layer and the second adhesive layer are formed on one of a first sheet and a second sheet that face each other in the sheet bundle, at least the first adhesive layer is formed on the other of the first sheet and the second sheet, and $G1>G2$ is satisfied, where G1 denotes a storage elastic modulus of the first toner forming the first adhesive layer, and G2 denotes a storage elastic modulus of the second toner forming the second adhesive layer.

One other aspect provides an image forming apparatus at least comprising:

first image forming means for forming a first adhesive layer of a first toner on a sheet;

second image forming means for forming a second adhesive layer of a second toner on the first adhesive layer; and third image forming means for forming a third adhesive layer of a third toner, wherein adhesive image patterns are formed from the first adhesive layer, the second adhesive layer, and the third adhesive layer, the image forming apparatus further comprising booklet bonding means for stacking a plurality of sheets to form a sheet bundle, and applying heat and pressure to the sheet bundle so that the sheets are bonded to each other with the adhesive image patterns interposed therebetween, to form a booklet, wherein both the first adhesive layer and the second adhesive layer are formed on one of a first sheet and a second sheet that face each other in the sheet bundle, at least the third adhesive layer is formed on the other of the first sheet and the second sheet, and $G1>G2$ and $G3>G2$ are satisfied, where G1 denotes a storage elastic modulus of the first toner forming the first adhesive layer, and G2 denotes a storage elastic modulus of the second toner forming the second adhesive layer, and G3 denotes a storage elastic modulus of the third toner forming the third adhesive layer.

Further, one other aspect provides an image forming apparatus comprising:

first image forming means for forming a first adhesive layer of a first toner on a sheet;

second image forming means for forming a second adhesive layer of a second toner on the first adhesive layer;

third image forming means for forming a third adhesive layer of a third toner on the second adhesive layer; and fourth image forming means for forming a fourth adhesive layer of a fourth toner on the third adhesive layer, wherein adhesive image patterns are formed from at least three adhesive layers of the first adhesive layer, the second adhesive layer, the third adhesive layer, and the fourth adhesive layer, the image forming apparatus further comprising booklet bonding means for stacking a plurality of sheets to form a sheet bundle, and applying heat and pressure to the sheet bundle so that the sheets are bonded to each other with the adhesive image patterns interposed therebetween, to form a booklet, wherein all of the adhesive image patterns are formed on one of a first sheet and a second sheet that face each other in the sheet bundle, and GA>GB is satisfied, where GA denotes a storage elastic modulus of a toner forming an adhesive layer A adjacent to a sheet, from among the at least three adhesive layers forming the adhesive image patterns in the sheet bundle, and GB denotes a storage elastic modulus of a toner forming an adhesive layer B other than the adhesive layer A.

According to the present disclosure, even when an image pattern for adhesion is formed using a plurality of toner layers, it is possible to achieve desirable booklet bonding strength. Further features of the present invention will become apparent from the following description of exemplary embodiments with reference to the attached drawings.

BRIEF DESCRIPTION OF THE DRAWINGS

FIGS. 7A to 7C are diagrams showing a stacking order of toners in an adhesive layer according to Example 1;

FIGS. 8A to 8C are schematic diagrams showing a melted state of toner in the adhesive layer that has undergone bonding processing;

DESCRIPTION OF THE EMBODIMENTS

Hereinafter, the present disclosure will be described in detail, but the present disclosure is not limited to such descriptions. In the present disclosure, the expressions "from XX to YY" and "XX to YY" mean a numerical range including the lower limit and the upper limit, which are the endpoints, unless otherwise specified. When numerical ranges are described in several levels, the upper and lower limits of each numerical range can be combined in any manner.

EXAMPLES

Image Forming Apparatus and Operations

Figure 1:
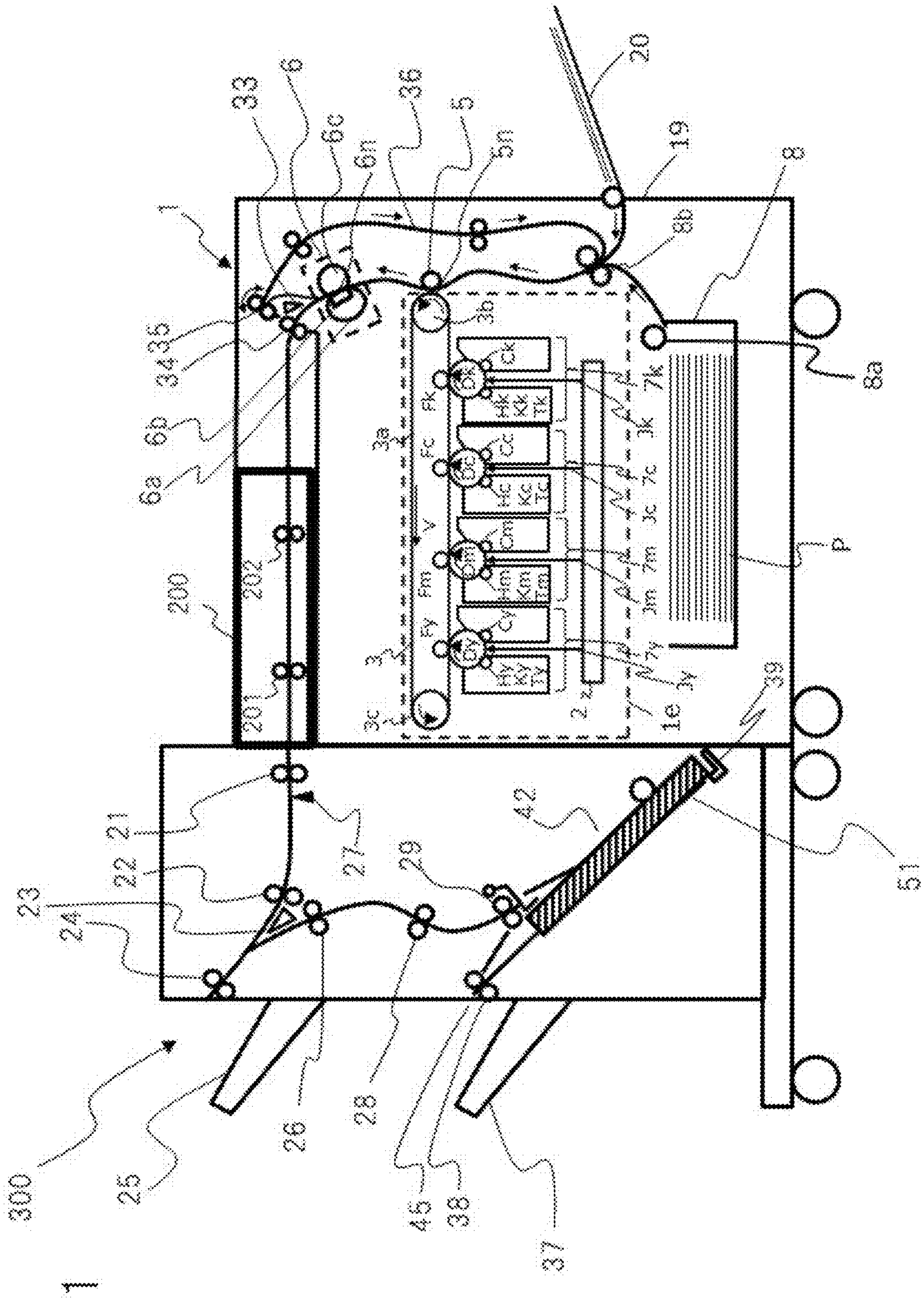
FIG. 1 is a cross-sectional view showing an image forming apparatus and a post-processing apparatus according to Example 1.

An overall configuration of an image forming apparatus will be described with reference to FIG. 1. FIG. 1 is a schematic diagram showing a cross-sectional configuration of an image forming apparatus 1 according to Example 1, which will be described later.

As shown in FIG. 1, the image forming apparatus 1 includes a sheet cassette 8 serving as a sheet storage section that stores sheets P serving as recording materials, an image forming unit 1*e* serving as an image forming means, a fixing apparatus 6 serving as a fixing means, and a housing 19 that accommodates these components. The image forming apparatus 1 has a printing function of forming a toner image on a sheet P fed from the sheet cassette 8, using the image forming unit 1*e*, and producing printed matter on which fixing processing has been performed by the fixing apparatus 6.

The sheet size may be changed as appropriate depending on the dimensions of the image forming apparatus used and is not particularly limited.

In the examples described later, the maximum size in the transport direction of each sheet P on which an image can be formed is A4 size (length 297 mm×width 210 mm), and the image is formed when the A4 size sheet is transported in the lengthwise direction. The sheet transport speed is also not particularly limited, and is 300 mm/sec in the examples described later.

The sheet cassette 8 is inserted into a bottom portion of the image forming apparatus 1 so as to be drawable from the housing 19, and holds a large number of sheets P. The sheets P stored in the sheet cassette 8 are fed from the sheet cassette 8 by a paper feed roller 8*a* serving as a paper feed section, and are transported by a pair of transport rollers 8*b*. Sheets set in a multi-tray 20 can also be fed one by one.

The image forming unit 1*e* is a tandem electrophotographic unit that includes four process cartridges 7*y*, 7*m*, 7*c*, and 7*k*, a scanner unit 2, and a transfer unit 3. Each process cartridge is a unit in which a plurality of parts responsible for an image forming process are integrated so as to be replaceable.

The process cartridges 7*y*, 7*m*, 7*c*, and 7*k* have substantially the same configuration except for the types of toner stored in four toner storage sections Ky, Km, Kc, and Kk thereof. That is to say, the process cartridges 7*y*, 7*m*, 7*c*, and 7*k* respectively include photoreceptor drums Dy, Dm, Dc, and Dk, which are image bearing members, charging rollers Cy, Cm, Cc, and Ck, which are charging devices, and toner storage sections Ky, Km, Kc, and Kk, which store toner and supply the toner to the photoreceptor drums.

The four toner storage sections Ky, Km, Kc, and Kk respectively store yellow (Ty), magenta (Tm), cyan (Tc), and black (Tk) toners for forming visible images on the sheets P. These toners for forming visible images can also be used as adhesive toners, which are powder adhesives (hereinafter simply referred to as "toners") used to perform bonding processing after printing.

The scanner unit 2 is located below the process cartridges 7*y*, 7*m*, 7*c*, and 7*k* and above the sheet cassette 8. The scanner unit 2 is an exposure means that irradiates the photosensitive drums Dy, Dm, Dc, and Dk in the process cartridges 7*y*, 7*m*, 7*c*, and 7*k* with laser beams Jy, Jm, Jc, and Jk, respectively, to write an electrostatic latent image.

The transfer unit 3 includes a transfer belt 3*a* serving as an intermediate transfer member (secondary image bearing member). The transfer belt 3*a* is a belt member wound around a secondary transfer inner roller 3*b* and a tension roller 3*c*, and the outer circumferential surface thereof faces the photosensitive drums Dy, Dm, Dc, and Dk in the process cartridges 7*y*, 7*m*, 7*c*, and 7*k*. Primary transfer rollers Fy, Fm, Fc, and Fk are provided on the inner circumference side of the transfer belt 3*a* at positions corresponding to the photosensitive drums Dy, Dm, Dc, and Dk, respectively. Further, a secondary transfer roller 5 serving as a transfer means is located so as to face the secondary transfer inner roller 3*b*. A transfer nip 5*n* between the secondary transfer roller 5 and the transfer belt 3*a* is a transfer section (secondary transfer section) where a toner image is transferred from the transfer belt 3*a* to a sheet P. The fixing apparatus 6 is provided above the secondary transfer roller 5.

The fixing apparatus 6 includes a cylindrical fixing film (endless belt) 6*a* serving as a heating rotating member and a pressure roller 6*c* serving as a pressure member. The fixing apparatus 6 includes a heater 6*b* serving as a heating means that is in contact with the inner surface of the fixing film 6*a*, and the pressure roller 6*c* serving as a pressure rotating member forming the fixing nip portion 6*n* together with the heater 6*b* with the fixing film 6*a* interposed therebetween.

Next, the operations of the image forming apparatus 1 will be described using FIG. 1 again. When data of an image such as an adhesive image pattern to be printed and a command to execute printing are input to the image forming apparatus 1, the control unit (not shown) of the image forming apparatus 1 starts a series of operations (image forming operations) to transport the sheets P and form the image on the sheets P. In the image forming operation, first, the sheets P are fed one by one from the sheet cassette 8, and are transported toward the transfer nip 5*n* via the transport roller 8*b*.

In parallel with the feeding of the sheets P, the process cartridges 7*y*, 7*m*, 7*c*, and 7*k* are sequentially driven, and the photosensitive drums Dy, Dm, Dc, and Dk are driven to rotate. At this time, the surfaces of the photosensitive drums Dy, Dm, Dc, and Dk are uniformly charged by charging rollers Cy, Cm, Cc, and Ck. The scanner unit 2 irradiates the respective photosensitive drums Dy, Dm, Dc, and Dk of the process cartridge 7*y*, 7*m*, 7*c*, and 7*k* with a laser beam modulated based on the image data so that electrostatic latent images are formed on the surfaces of photosensitive drums Dy, Dm, Dc, and Dk. Next, using the toners carried on developing rollers Hy, Hm, Hc, and Hk provided in the toner storage sections Ky, Km, Kc, and Kk of the process cartridges 7*y*, 7*m*, 7*c*, and 7*k*, the electrostatic latent images on the photosensitive drums Dy, Dm, Dc, and Dk are developed as toner images.

The transfer belt 3*a* rotates in the counterclockwise direction (indicated by an arrow V) in the figure. The toner images formed in the process cartridges 7*y*, 7*m*, 7*c*, and 7*k* are transferred from the photosensitive drums Dy, Dm, Dc, and Dk to the transfer belt 3*a* due to electric fields formed between the photosensitive drums Dy, Dm, Dc, and Dk and the primary transfer rollers Fy, Fm, Fc, and Fk.

The toner images carried on the transfer belt 3*a* and reaching the transfer nip 5*n* are secondarily transferred onto the transported sheet P due to an electric field formed between the secondary transfer roller 5 and the secondary transfer inner roller 3*b*.

In the toner images formed on the sheet P after the secondary transfer, if the toner images include all four color toners, the black toner Tk is arranged at a position closest to the sheet P. The cyan toner Tc is arranged on the black toner Tk, the magenta toner Tm is arranged on the cyan toner Tc, and the yellow toner Ty is arranged at the farthest position from the sheet P.

Thereafter, the sheet P is transported to the fixing apparatus 6 and undergoes thermal fixing processing. That is, when the sheet P passes through the fixing nip 6*n*, heat and pressure are applied to the toner images on the sheet P, and the toners Ty, Tm, Tc, and Tk are melted and then solidified to form an adhesive layer. Thus, an image such as an adhesive image pattern fixed on the sheet P is obtained.

A switching guide 33 is a flap-shaped guide member for switching the transport direction when either a single-sided printing mode in which an image is formed on one side of the sheet P or a double-sided printing mode in which images are formed on both sides of the sheet P is selected. In the case of the single-sided printing mode, the switching guide 33 transports the sheet P toward a paper discharge roller pair 34.

On the other hand, in the case of the double-sided printing mode, the switching guide 33 transports the sheet P toward a switchback roller pair 35, and the switchback roller pair 35 reverses the rotation direction after discharging the sheet P to the rear end, thereby the sheet P is transported toward a double-sided transport path 36 for double-sided printing. The sheet P transported to the double-sided transport path 36 passes through the secondary transfer section and the fixing section again, so that an image such as an adhesive layer is formed on a second side (unprinted side of the sheet) opposite to a first side of the sheet. Thereafter, the sheet P on which the image has been formed is transported by the switching guide 33 toward the paper discharge roller pair 34, and the paper discharge roller 34 transports the sheet P to a post-processing apparatus 300 via an intermediate transport unit 200, which includes transport roller pairs 201 and 202.

The post-processing apparatus 300 has a floor standing type configuration, and includes, in a lower portion thereof, a sheet alignment means, and a thermocompression bonding unit 51 serving as a booklet bonding apparatus that heats and presses the aligned sheet bundle for a predetermined period of time. Here, in the examples described later, the sheet transport speed of the intermediate transport unit 200 and the post-processing apparatus 300 is 600 mm/sec.

The image forming apparatus includes booklet bonding means for stacking a plurality of sheets, on each of which an adhesive image pattern constituted by adhesive layers is formed, to form a sheet bundle, and applying heat and pressure to the sheet bundle so that the sheets are bonded to each other with the adhesive image pattern interposed therebetween, to form a booklet. The thermocompression bonding unit 51 is such a booklet bonding means.

The sheet P transported from the intermediate transport unit 200 is delivered to the transport roller pair 21 of the post-processing apparatus 300. A transport roller 22 accelerates the sheet at a predetermined timing based on the trailing edge passing time of an entrance sensor 27. In image formation where sheets are not bonded together, if a sheet is to be discharged to an upper paper discharge tray 25, the sheet is decelerated to a predetermined discharge speed and discharged to the upper paper discharge tray 25 when the trailing edge of the sheet reaches a position between the transport roller 22 and a reversing roller 24.

In the case of forming a booklet by bonding sheets together, the bonded booklet is discharged from a lower paper discharge tray 37 via the thermocompression bonding unit 51. In this case, the transport of the sheet is temporarily stopped when the trailing edge of the sheet passes through a backflow prevention valve 23, which is biased clockwise in the figure by a spring (not shown), and thereafter the sheet is switched back and transported to an inner paper discharge roller 26.

The sheet P transported from the inner paper discharge roller 26 is sent to a kicking roller 29 via an intermediate transport roller 28, and is thereafter transported to an intermediate stacking section 42. A lengthwise alignment reference plate 39 is located at the most downstream part of the intermediate stacking section 42, and the sheet bundle is aligned by abutting the sheet ends in the transport direction against this plate.

Figure 2B:
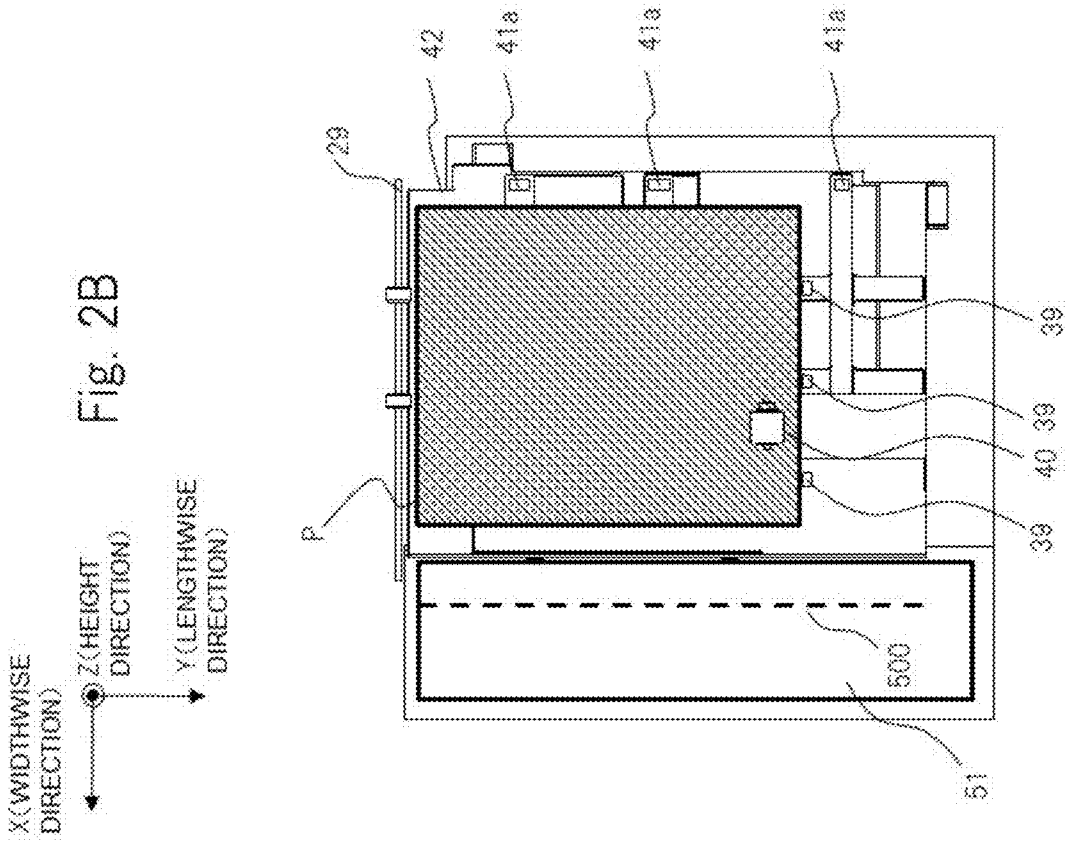
FIGS. 2A to 2D are schematic diagrams showing a sheet alignment method of the post-processing apparatus.
Figure 2A:
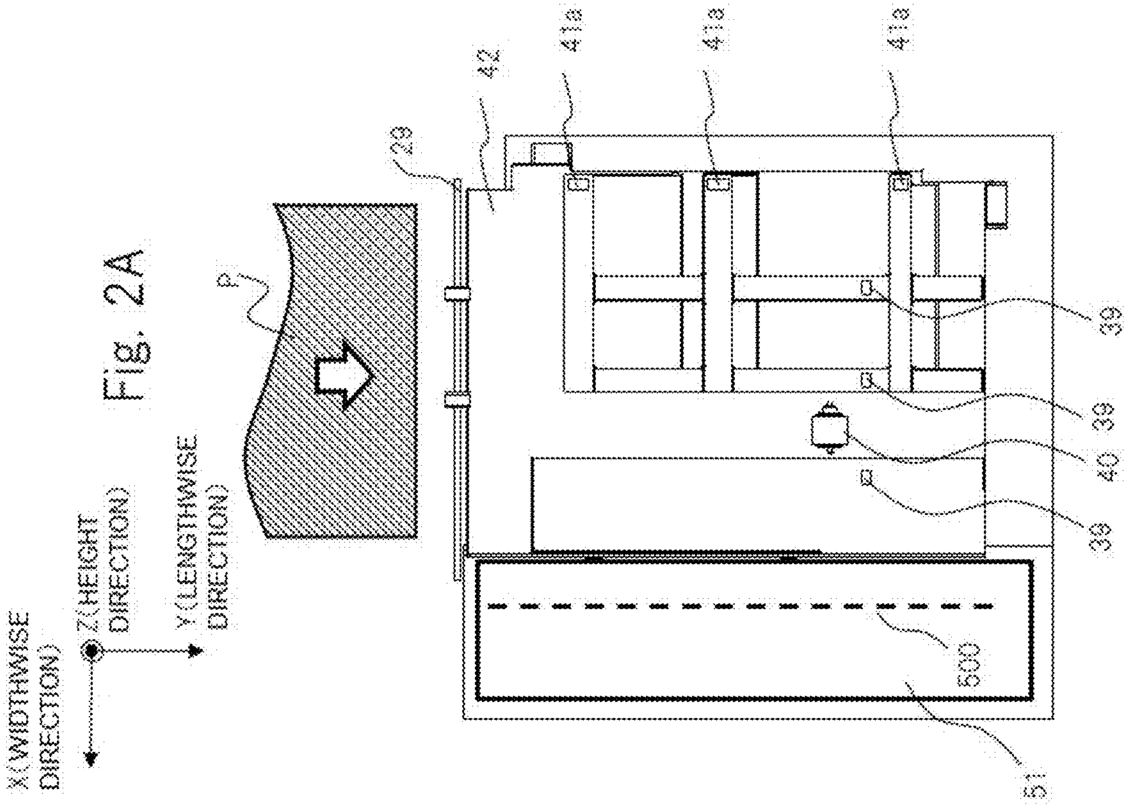

The sheet alignment method will be described using FIG. 1 and FIGS. 2A to 2D. Here, the lengthwise direction of the sheet P is referred to as a Y direction, the widthwise direction is referred to as an X direction, and the height direction is referred to as a Z direction. As shown in FIG. 2A, in the intermediate stacking section 42, a half-moon roller 40 for pushing the sheet P that has passed through the kicking roller 29 onto the lengthwise alignment reference plate 39 is rotatably supported. The half-moon roller 40 transports the sheet toward the lengthwise alignment reference plate 39 at a predetermined timing. As shown in FIG. 2B, the half-moon roller 40 is adjusted so that the transport pressure allows the half-moon roller 40 to slip on the sheet after the sheet abuts against the lengthwise alignment reference plate 39.

Figure 2D:
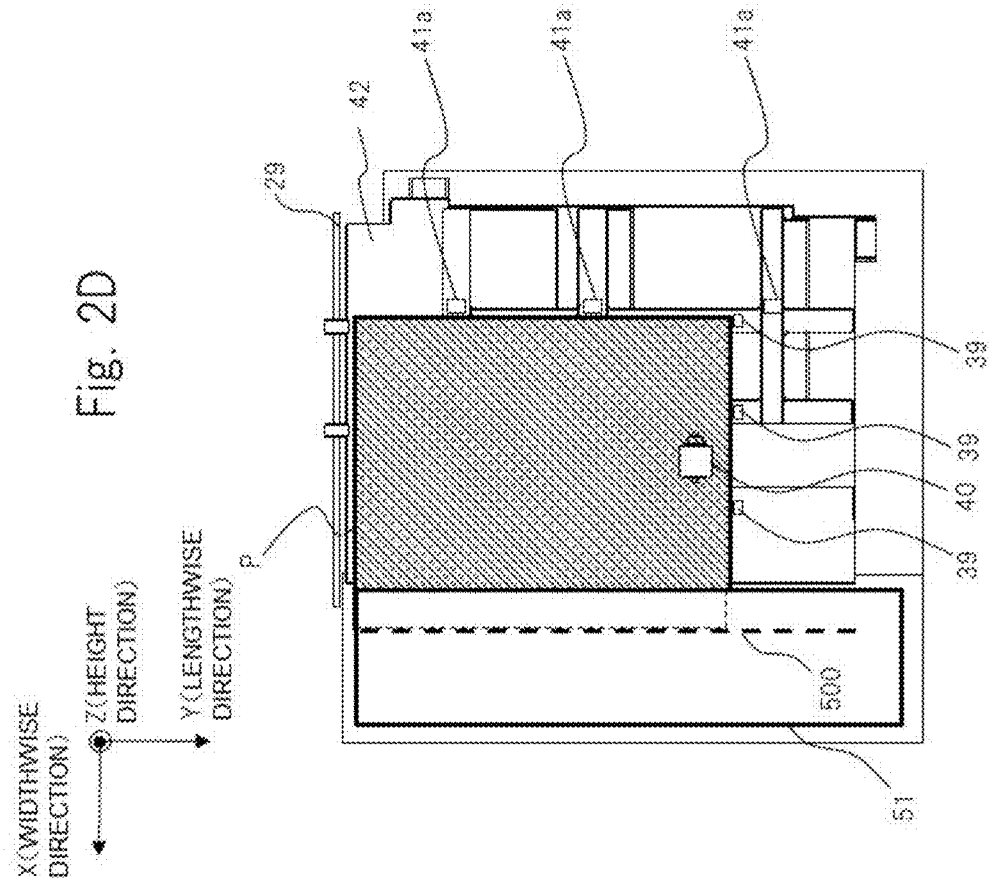
Figure 2C:
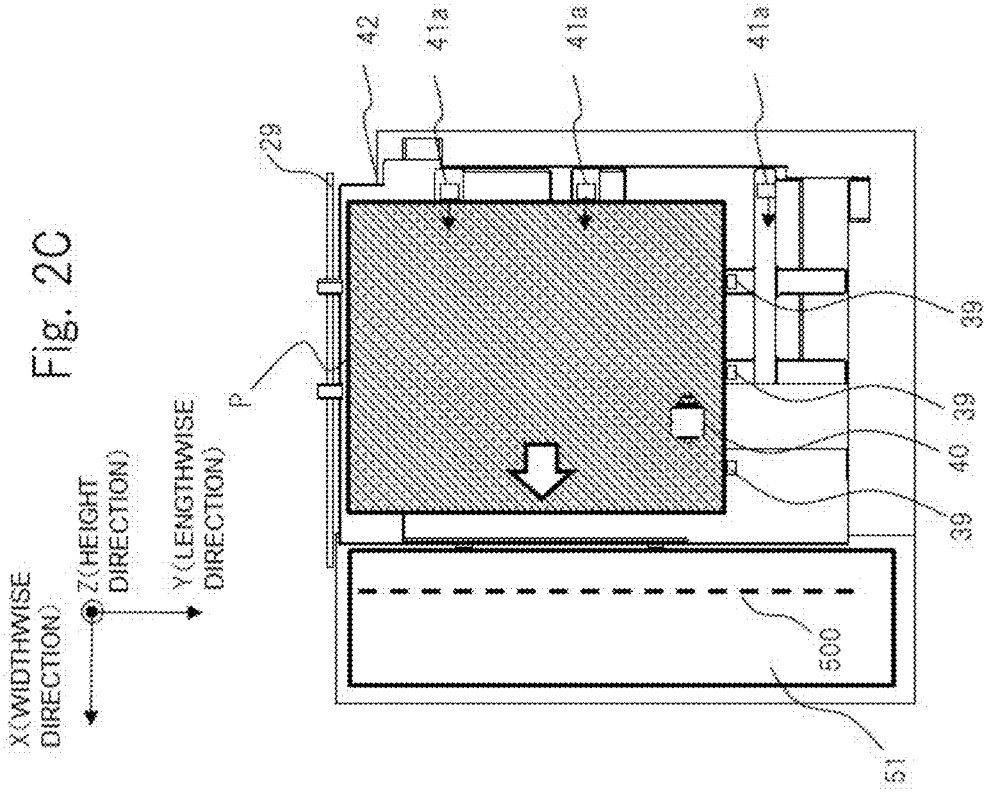

After the sheet reaches the lengthwise alignment reference plate 39, as shown in FIG. 2C, a widthwise alignment jogger 41*a* performs alignment operation until implementation of abutting against a widthwise alignment reference plate 500 (dotted line), so that the sheet bundle is aligned at a predetermined position as shown in FIG. 2D. The operations shown in FIGS. 2C and 2D are performed all at once for every predetermined number of sheets in conjunction with the binding operation by the thermocompression bonding unit 51 serving as a sheet bonding means.

The thermocompression bonding unit 51 performs thermocompression bonding processing on the sheet bundle constituted by a plurality of sheets P to produce a booklet bound at the left end or at the right end. The bundle of sheets aligned in the lengthwise and widthwise directions is subjected to heating and pressing processing performed by the thermocompression bonding unit 51, thereby a booklet that is aligned with high precision can be produced.

Figure 3A:
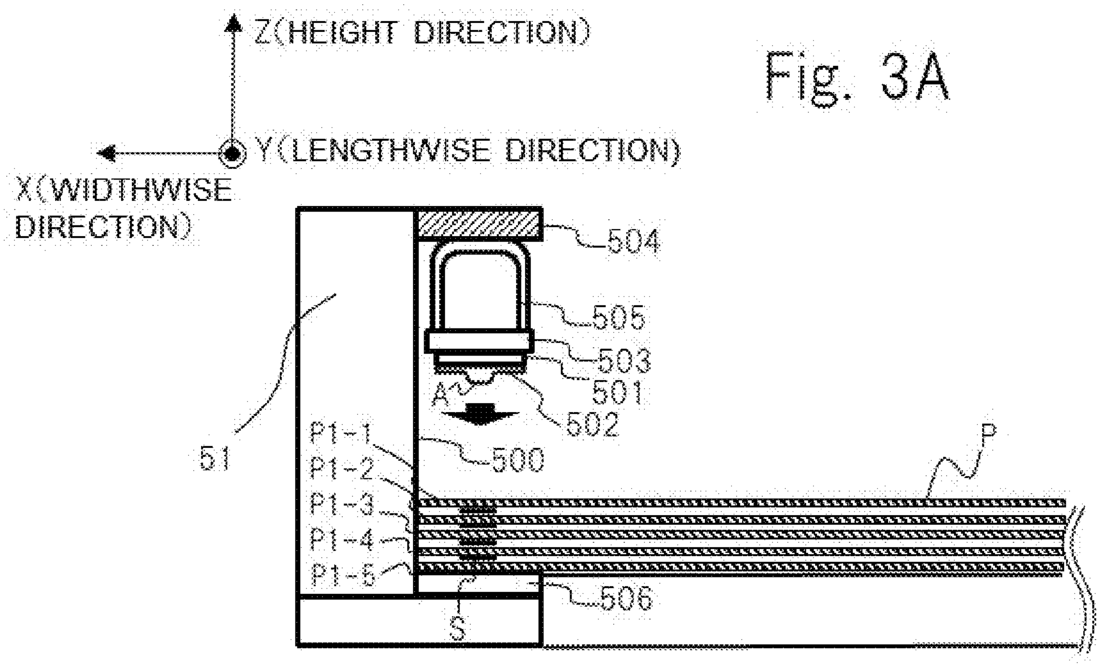
FIGS. 3A to 3C are cross-sectional views showing a configuration of a thermal compression bonding unit.

The structure of the thermocompression bonding unit 51 will be further described. FIG. 3A is a cross-sectional view showing the thermocompression bonding unit 51, and the thermocompression bonding unit 51 includes an aluminum heating plate 502 disposed on a ceramic heater 501 that includes a built-in heating element serving as a heat source. In the examples described below, the dimensions of the ceramic heater are 1.0 mm thick, 8.0 mm wide, and 350 mm long. The ceramic heater 501 can be controlled to any set temperature by a temperature detection means and a power application means supported by a heater support 503 (not shown).

In the examples described later, the set temperature was adjusted so that the surface temperature of a pressure section A of the heating plate 502 was 200° C. Here, by providing the pressure section A in the heating plate 502, the heat and pressure of the thermocompression bonding unit 51 is concentrated only on the region where the adhesive image pattern is present, which is the binding position of the sheet bundle, and heating and pressing processing can be efficiently performed. The ceramic heater is supported by the heater support 503 made of resin.

The degree of heating and pressing can be set depending on the melting characteristics of the toner. For example, the peak value of the temperature of the adhesive image pattern is preferably set to 90° C. to 140° C., more preferably 110° C. to 130° C. The surface temperature of the pressure section A is, for example, 180° C. to 240° C.

A pressure lever 504 obtains power from a drive source (not shown) in order to push down the thermocompression bonding unit 51 in the −Z direction (downward) and apply pressure to the sheet bundle. The pressing force of the pressure lever 504 is transmitted via a metal stay 505, which is a rigid body. In the examples described later, the pressure lever 504 applies pressure to the sheet bundle P with a total pressure of 30 kgf. Here, the reference numeral 506 indicates a pressure plate made of silicone rubber with a thickness of 2.0 mm, and is a member for stably receiving the pressure force. The pressure to be applied need only be sufficient to form a sheet bundle, and the total pressure on the sheet bundle P is preferably 25 kgf to 50 kgf, more preferably 28 kgf to 40 kgf.

Figure 3B:
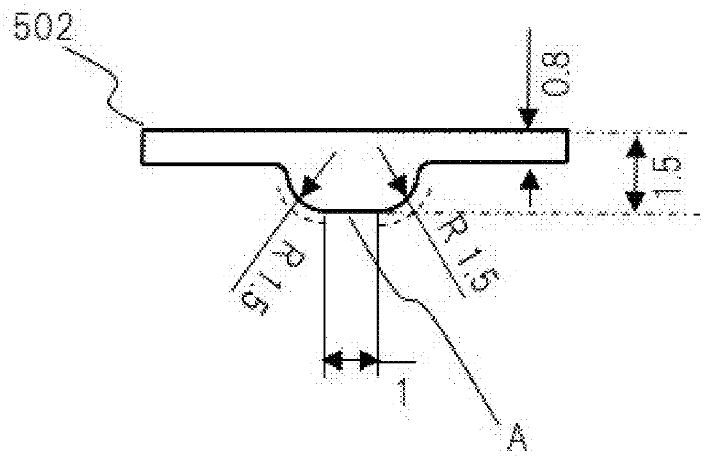

In the examples described later, the thermocompression bonding unit 51 presses the sheet bundle for two seconds, and then separates from the sheet bundle. The thermocompression bonding unit 51 is capable of bonding up to five sheets P with a basis weight of up to 90 $g/m^2$ at one time. FIG. 3B shows the cross-sectional shape of the heating plate 502, and in the examples described later, the pressure section A has a flat portion of 1.0 mm and curved portions with R 1.5 on both sides thereof. The length of the heating plate 502 in the Y direction is 300 mm.

Figure 3C:
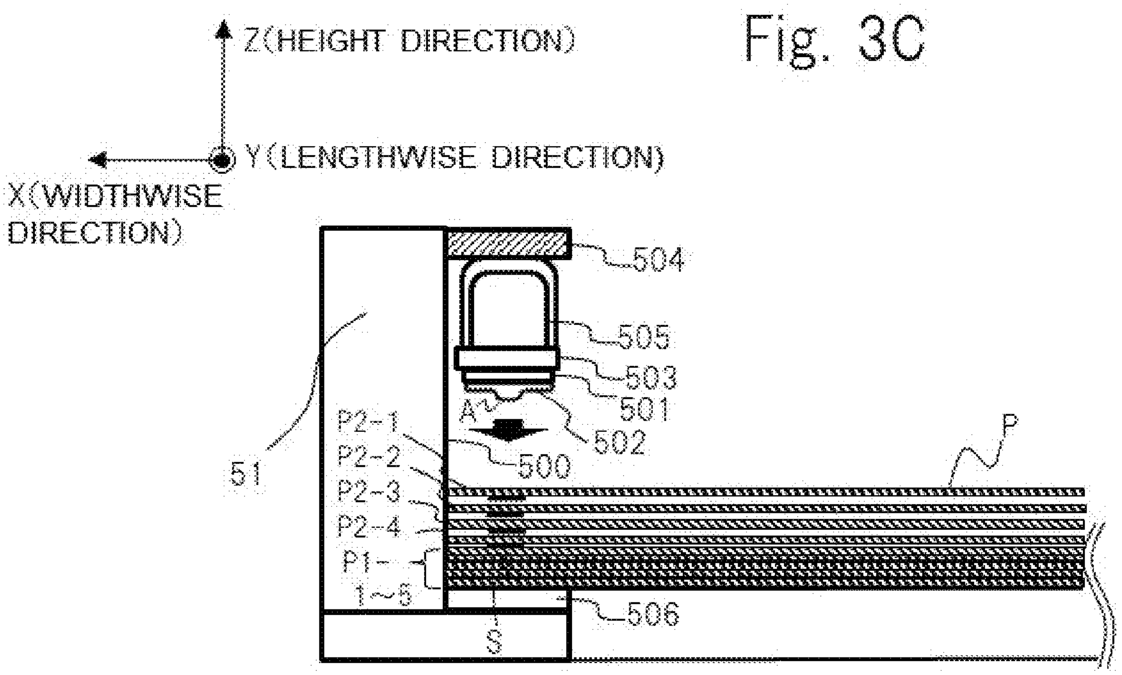

As shown in FIG. 3A, after bonding processing is performed once using the thermocompression bonding unit 51 (P1-1 to P1-5), the sheets P may be sequentially stacked thereon (P2-1 to P2-4) and P1-1 to P1-5 and P2-1 to P2-4 may be bonded together as shown in FIG. 3C. In this way, it is possible to form a product, which is a large number of booklets. In the examples described later, the configuration is such that a maximum of fifty booklets can be produced by feeding five sheets P at the first time and a maximum of four sheets thereafter. During continuous operation, the sheets P are fed to the thermocompression bonding unit 51, and the thermocompression bonding unit 51 repeats a lowering operation, a pressurizing operation (for two seconds), and an ascending operation, thereby enabling efficient booklet production.

After the bonding processing by the thermocompression bonding unit 51 has been completed, a bundle discharge guide (not shown) moves in parallel from a standby position toward a sheet discharge port 45 to push out the booklet. The sheet discharge port 45 is provided with a bundle discharge roller 38.

The bundle discharge guide stops at a position where the leading edge of the booklet slightly exceeds the bundle discharge roller 38, and returns to the standby position again. The bundle discharge roller 38 discharges the booklet received from the bundle discharge guide onto the lower paper discharge tray 37.

In the present disclosure, an image forming apparatus includes image forming means for forming adhesive image patterns including adhesive layers of toner on a sheet; and booklet bonding means for stacking a plurality of sheets on which the adhesive image patterns are formed to form a sheet bundle and bonding the sheets to each other with the adhesive image patterns interposed therebetween by applying heat and pressure to the sheet bundle, to form a booklet. The adhesive image patterns include at least three adhesive layers of toner, and each of the at least three adhesive layers is formed of a different toner.

In the sheet bundle, the storage elastic modulus of the toner that forms an adhesive layer A, which is the adhesive layer adjacent to the sheet among the at least three adhesive layers forming the adhesive image pattern, is denoted as GA. The storage elastic modulus of the toner that forms an adhesive layer B, which is an adhesive layer other than the adhesive layer A among the at least three adhesive layers, is denoted as GB. At this time, GA and GB satisfy GA>GB. This means that, in the adhesive image pattern, the storage elastic modulus of the toner in the adhesive layer that is in contact with the sheet is higher than the storage elastic modulus of the toners in the other adhesive layers (adhesive layers that are not in contact with the sheet).

In the sheet bundle, at least three adhesive layers are present in the adhesive image pattern between the two sheets facing each other, namely a first sheet and a second sheet, and therefore, there can be two types of toner that form the adhesive layer A, whose storage elastic modulus is measured as GA. The storage elastic modulus GA of both of these two types of toner is greater than GB. When the at least three adhesive layers are four layers or more, there are a plurality of types of toner that form the adhesive layer B, whose storage elastic modulus is measured as GB. In such a case, no matter which GA and GB are selected, GA>GB is satisfied.

By setting the storage elastic moduli in such a relationship, desirable booklet bonding strength can be achieved even when the adhesive image pattern is formed using a plurality of toner layers. The reasons for this will be described later in "Mechanism of Developing Booklet Bonding Strength".

The present disclosure can also provide a method for producing a booklet.

The booklet production method includes:

- forming adhesive image patterns that include adhesive layers of toner on sheets by using image forming means;
- stacking the plurality of sheets on which the adhesive image patterns are formed to form a sheet bundle and bonding the sheets to each other with the adhesive image patterns interposed therebetween by applying heat and pressure to the sheet bundle, to form a booklet.

In the adhesive image patterns, at least three adhesive layers of toner are formed, and the at least three adhesive layers are each formed with a different toner. The toner used in the three adhesive layers satisfies the relationship GA>GB as described for the above image forming apparatus.

Formation of such adhesive image patterns that each include at least three adhesive layers and production of a booklet can be performed using the above-described image forming apparatus. Hereinafter, the formation of the adhesive layers will be described regarding more specific aspects.

At Least One Aspect of Present Disclosure

The following describes each aspect. In each of the following aspects, the above-described image forming apparatus can be employed.

In at least one aspect of the present disclosure, the image forming apparatus may include: first image forming means for forming a first adhesive layer of a first toner on a sheet; and second image forming means for forming a second adhesive layer of a second toner on the first adhesive layer. That is to say, the image forming means at least includes first image forming means and second image forming means. The image forming apparatus may include third image forming means for forming a third adhesive layer of a third toner on the second adhesive layer. These image forming means may correspond to the above-described process cartridges 7*y*, 7*m*, 7*c*, and 7*k*.

For example, a first adhesive layer formed of a first toner and a second adhesive layer formed of a second toner may be stacked on a first side of a sheet in this order so that the second adhesive layer constitutes the top surface. That is to say, at least the sheet, the first adhesive layer, and the second adhesive layer are formed in this order. For example, an adhesive layer may be further provided on the second adhesive layer as long as the effects of the present disclosure are not impaired. Adhesive image patterns are formed from these first and second adhesive layers.

In addition, the first toner may include a plurality of colors of toner, and the second toner may include a plurality of colors of toner as long as the effects of the present disclosure are not impaired. In addition, the first toner and the second toner may be of the same color as long as the effects of the present disclosure are not impaired.

It is preferable that the first toner is a black toner Tk. It is preferable that the second toner is at least one selected from the group consisting of a cyan toner Tc, a magenta toner Tm, and a yellow toner Ty.

It is preferable that the first image forming means is a process cartridge having the black toner Tk. It is preferable that the second image forming means is a process cartridge having the cyan toner Tc, a process cartridge having the magenta toner Tm, or a process cartridge having the yellow toner Ty.

A plurality of sheets, on each of which adhesive image patterns constituted by adhesive layers are formed, are stacked to form a sheet bundle, and heat and pressure is applied to the sheet bundle so that the sheets are bonded to each other with the adhesive image patterns interposed therebetween to form a booklet. For example, a booklet can be obtained by stacking a plurality of sheets with adhesive layers formed thereon to obtain a sheet bundle, and heating the adhesive image patterns of the adhesive layers in the sheet bundle to bond the sheets to each other.

Figure 7A:
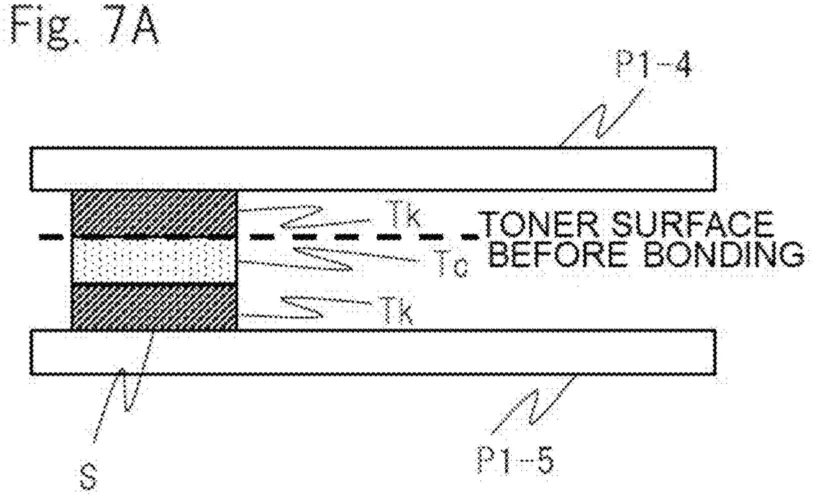
Figure 7B:
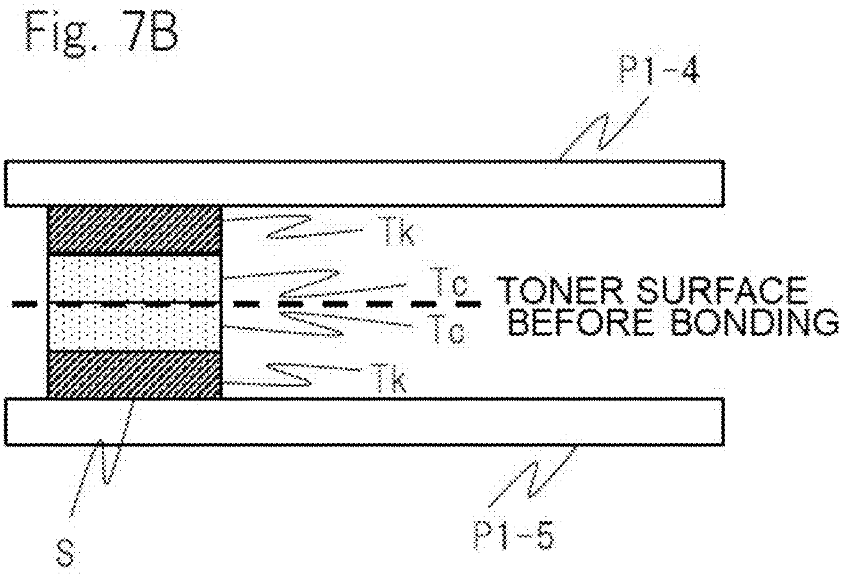

In at least one aspect of the present disclosure, at least both the first adhesive layer and the second adhesive layer are formed on one of a first sheet and a second sheet that are two sheets facing each other in the sheet bundle. At least the first adhesive layer is formed on the other sheet (FIGS. 7A to 7C). In this way, adhesive image patterns constituted by at least three adhesive layers is formed. For example, the first adhesive layer, the second adhesive layer, and the first adhesive layer are formed in this order between the sheets.

A third adhesive layer may be further formed on the first adhesive layer and the second adhesive layer. FIG. 7C shows an example in which an adhesive layer of Tm is additionally formed.

A second adhesive layer may further be provided on the first adhesive layer of the other sheet. For example, both the first adhesive layer and the second adhesive layer may be formed on the first adhesive layer of the other sheet. FIG. 7B is an example in which the first adhesive layer and the second adhesive layer are formed on both one and the other of the first sheet and the second sheet, which are two sheets facing each other.

By employing the above-described double-sided printing mode, it is possible to produce such a sheet bundle. For example, both the first adhesive layer and the second adhesive layer are formed on one side of a sheet, and at least the first adhesive layer is formed on the other side. In this way, a sheet bundle can be produced by stacking a plurality of sheets having adhesive layers formed thereon. As a result, adhesive image patterns having at least three adhesive layers are formed between the sheets. It is preferable that no adhesive layer be formed on the front side of the sheet bundle that can be the cover of the booklet. The number of sheets included in the sheet bundle can be set freely. The plurality of sheets may be two sheets or more.

In at least one aspect of the present disclosure, the storage elastic modulus of the first toner forming the first adhesive layer is G1, and the storage elastic modulus of the second toner forming the second adhesive layer is G2. Here, G1 and G2 satisfy G1>G2. For example, in FIGS. 7A and 7B, the storage elastic modulus of the black toner Tk adjacent to the sheet is G1.

By setting the storage elastic moduli in such a relationship, desirable booklet bonding strength can be achieved even when the adhesive image patterns are formed using a plurality of toner layers. The reasons for this will be described later in "Mechanism of Developing Booklet Bonding Strength".

Note that in at least one aspect of the present disclosure, G1 corresponds to the above-mentioned GA, and G2 corresponds to the above-mentioned GB.

Another Aspect of Present Disclosure

In another aspect of the present disclosure, the image forming apparatus may include: first image forming means for forming a first adhesive layer of a first toner on a sheet; second image forming means for forming a second adhesive layer of a second toner on the first adhesive layer; and third image forming means for forming a third adhesive layer of a third toner. That is to say, the image forming means at least includes the first image forming means, the second image forming means, and the third image forming means. The image forming means are the same as above. Adhesive image patterns are formed from the first, second, and third adhesive layers.

Figure 10A:
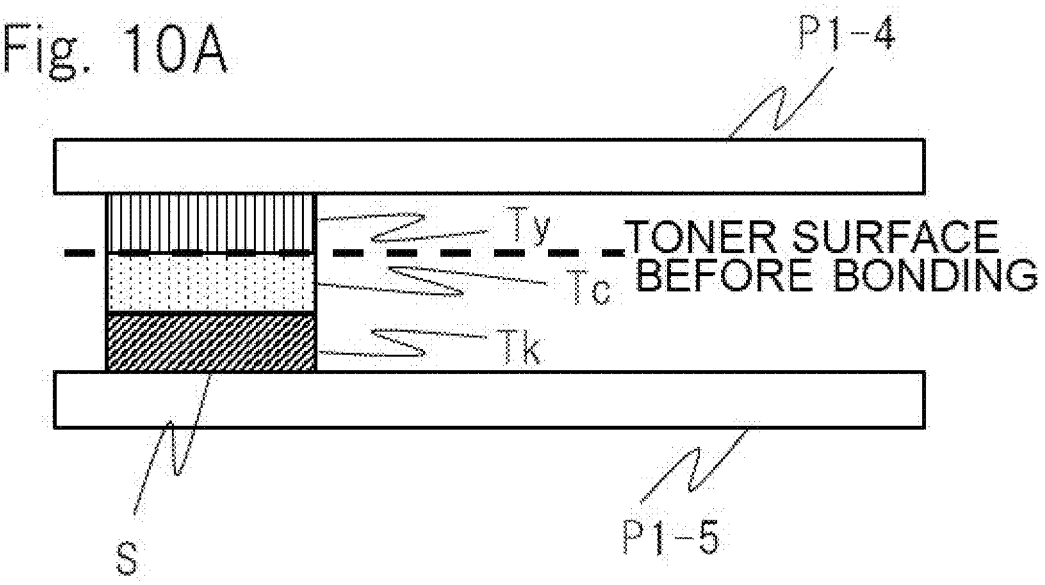
FIGS. 10A to 10C are diagrams showing a stacking order of toners in an adhesive layer according to Example 2.

The image forming apparatus includes booklet bonding means for stacking a plurality of sheets, on each of which adhesive layers are formed, to form a sheet bundle, and applying heat and pressure to the sheet bundle so that the sheets are bonded to each other with the adhesive image pattern constituted by the adhesive layers therebetween, to form a booklet. Both the first adhesive layer and the second adhesive layer are formed on one of a first sheet and a second sheet that are two sheets facing each other in the sheet bundle, and at least the third adhesive layer is formed on the other (FIG. 10A). In this way, adhesive image patterns constituted by at least three adhesive layers is formed, and for example, the first adhesive layer, the second adhesive layer, and the third adhesive layer are formed in this order between the sheets.

A fourth adhesive layer may be further provided on the other third adhesive layer, i.e., between the second adhesive layer and the third adhesive layer as long as the effects of the present disclosure are not impaired.

By employing the above-described double-sided printing mode, it is possible to produce such a sheet bundle. For example, a first adhesive layer formed of a first toner and a second adhesive layer formed of a second toner are stacked on a first side of a sheet in this order so that the second adhesive layer constitutes the top surface. A third adhesive layer formed of a third toner can be formed on another sheet.

Alternatively, a first adhesive layer formed of a first toner and a second adhesive layer formed of a second toner are stacked on a first side of a sheet in this order. A third adhesive layer of a third toner may be formed on a second side opposite to the first side of the sheet. In this way, a sheet bundle can be produced by stacking a plurality of sheets having adhesive layers formed thereon. It is preferable that no adhesive layer be formed on the front side of the sheet bundle that can be the cover of the booklet. The number of sheets can be set freely.

In addition, the first toner may include a plurality of colors of toner, and the second toner may include a plurality of colors of toner as long as the effects of the present disclosure are not impaired. The third toner may include a plurality of colors of toner. Two or more toners selected from the group consisting of the first toner, the second toner, and the third toner may be of the same color as long as the effects of the present disclosure are not impaired.

It is preferable that the first toner is a black toner Tk. It is preferable that the second toner is at least one selected from the group consisting of a cyan toner Tc and a magenta toner Tm. It is preferable that the third toner is a yellow toner Ty.

A plurality of sheets on which adhesive layers are formed are stacked to form a sheet bundle, and heat and pressure is applied to the sheet bundle so that the sheets are bonded to each other with the adhesive image patterns of adhesive layers therebetween to form a booklet. For example, heat is applied to the adhesive layers in the sheet bundle.

In another one aspect of the present disclosure, the storage elastic modulus of the first toner forming the first adhesive layer is G1, the storage elastic modulus of the second toner forming the second adhesive layer is G2, and the storage elastic modulus of the third toner forming the third adhesive layer is G3. Here, G1, G2, and G3 satisfy G1>G2 and G3>G2. For example, in FIG. 10A, the storage elastic modulus of the black toner Tk adjacent to the sheet is G1, and the storage elastic modulus of the yellow toner Ty is G3.

By setting the storage elastic moduli in such a relationship, desirable booklet bonding strength can be achieved even when the adhesive image patterns are formed using a plurality of toner layers. The reasons for this will be described later in "Mechanism of Developing Booklet Bonding Strength".

Note that in another aspect of the present disclosure, G1 and G3 correspond to the above-mentioned GA, and G2 corresponds to the above-mentioned GB.

Yet Another Aspect of Present Disclosure

In yet another aspect of the present disclosure, the image forming apparatus may include: first image forming means for forming a first adhesive layer of a first toner on a sheet; second image forming means for forming a second adhesive layer of a second toner on the first adhesive layer; third image forming means for forming a third adhesive layer of a third toner on the second adhesive layer; and fourth image forming means for forming a fourth adhesive layer of a fourth toner on the third adhesive layer. That is to say, the image forming means at least includes the first image forming means, the second image forming means, the third image forming means, and the fourth image forming means. The image forming means are the same as above.

Adhesive image patterns are formed from at least three adhesive layers of the first, second, third, and fourth adhesive layers.

Figure 10B:
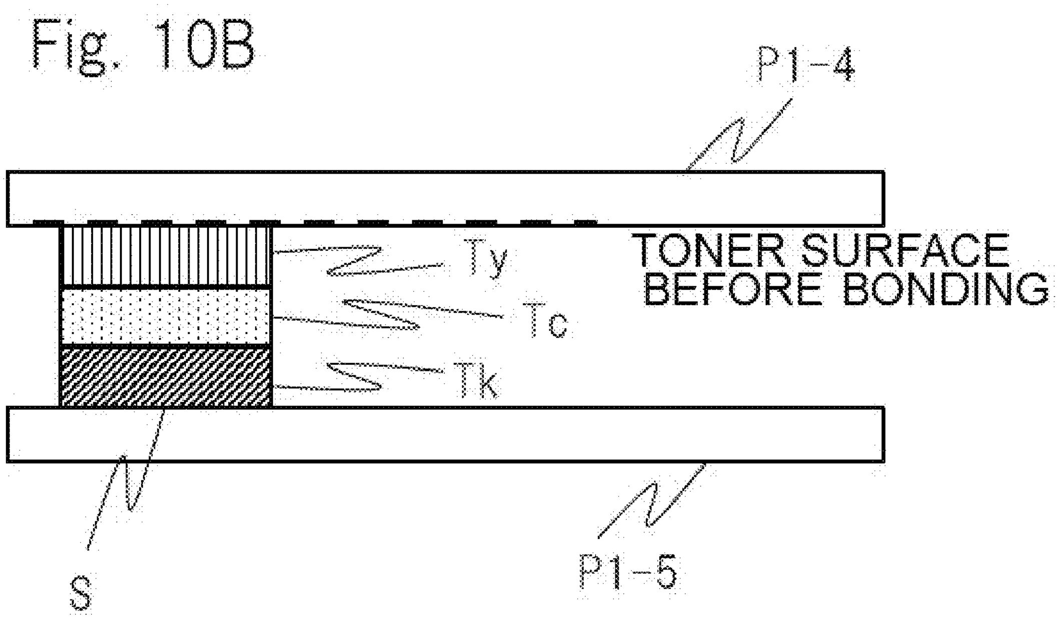
Figure 10C:
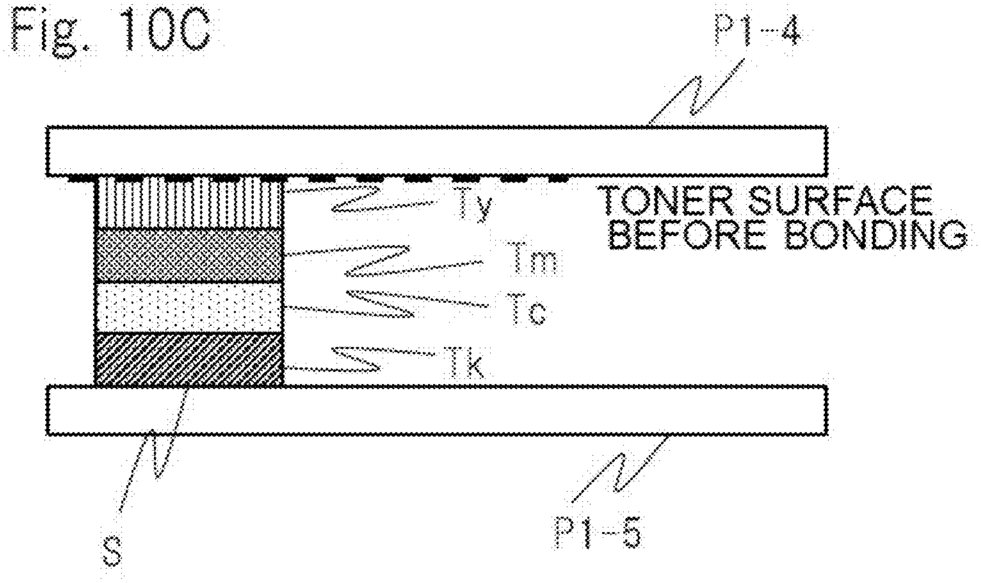

The image forming apparatus includes booklet bonding means for stacking a plurality of sheets, on each of which adhesive image patterns constituted by adhesive layers is formed, to form a sheet bundle, and applying heat and pressure to the sheet bundle so that the sheets are bonded to each other with the adhesive image patterns interposed therebetween, to form a booklet. All of the adhesive image patterns constituted by at least three adhesive layers are formed on one of a first sheet and a second sheet that are two sheets facing each other in the sheet bundle (FIG. 10B). The number of adhesive layers is at least three, and may be four. For example, adhesive image patterns constituted by the first adhesive layer, the second adhesive layer, the third adhesive layer, and the fourth adhesive layer may be formed (FIG. 10C).

By employing the above-described one-sided printing mode, it is possible to produce such a sheet bundle. For example, it is possible to form an adhesive image pattern in which the first adhesive layer, the second adhesive layer, the third adhesive layer, and the fourth adhesive layer are stacked on a first side of a sheet in this order.

In this way, a sheet bundle can be produced by stacking a plurality of sheets having adhesive layers formed thereon. It is preferable that no adhesive layer be formed on the front side of the sheet bundle that will be the cover of the booklet. The number of sheets can be set freely.

In addition, the first toner may include a plurality of colors of toner, and the second toner may include a plurality of colors of toner as long as the effects of the present disclosure are not impaired. The third toner may include a plurality of colors of toner. Two or more toners selected from the group consisting of the first toner, the second toner, the third toner, and the fourth toner may be of the same color as long as the effects of the present disclosure are not impaired.

It is preferable that the first toner is a black toner Tk. It is preferable that the second toner is one of the cyan toner Tc and the magenta toner Tm, and the third toner is the other of the cyan toner Tc and the magenta toner Tm. It is preferable that the fourth toner is a yellow toner.

A plurality of sheets, on each of which adhesive image patterns constituted by adhesive layers is formed, are stacked to form a sheet bundle, and heat and pressure is applied to the sheet bundle so that the sheets are bonded to each other with the adhesive image patterns interposed therebetween. For example, heat is applied to the adhesive image patterns in the sheet bundle.

In yet another aspect of the present disclosure, in the sheet bundle, the storage elastic modulus of the toner that forms an adhesive layer A, which is the adhesive layer adjacent to the sheet among at least three adhesive layers forming the adhesive image patterns, is denoted as GA. The storage elastic modulus of the toner that forms an adhesive layer B, which is an adhesive layer other than the adhesive layer A among the at least three adhesive layers, is denoted as GB. Here, GA and GB satisfy GA>GB. This means that, as in the above case, in the adhesive image patterns, the storage elastic modulus of the toner in the adhesive layer that is in contact with the sheet is higher than the storage elastic modulus of the toners in the other adhesive layers.

For example, in the case shown in FIG. 10B, the storage elastic modulus of Ty and Tk is GA, and the storage elastic modulus of Tc is GB. In the case shown in FIG. 10C, the storage elastic modulus of Ty and Tk is GA, and the storage elastic modulus of Tm and Tc is GB. No matter which toners corresponding to GA and GB are selected, GA>GB is satisfied. For example, the storage elastic modulus of the first toner is higher than the storage elastic modulus of the second toner, and the storage elastic modulus of the fourth toner is higher than the storage elastic modulus of the third toner.

By setting the storage elastic moduli in such a relationship, desirable booklet bonding strength can be achieved even when the adhesive image patterns are formed using a plurality of toner layers. The reasons for this will be described later in "Mechanism of Developing Booklet Bonding Strength".

Storage Elastic Modulus

As described above, in the present disclosure, the storage elastic modulus of the toner in the adhesive layer that is in contact with the sheet is higher than the storage elastic modulus of the toners in the other adhesive layers. The temperature at which the storage elastic modulus is measured is preferably the peak temperature of the adhesive layer (adhesive image patterns) during operation of the booklet adhesive means, more preferably 120° C. That is to say, the storage elastic modulus is more preferably the storage elastic modulus G'(120° C.) of the toner at 120° C.

The ratio values of the above-described storage elastic modulus GA/GB, G1/G2, and G3/G2 are preferably 1.1 to 4.0, more preferably 1.2 to 3.0, and even more preferably 1.4 to 2.5. Higher bonding strength is likely to be achieved within the above ranges.

GA, G1, and G3 (preferably G'(120° C.)) are not particularly limited as long as GA>GB, G1>G2, and G3>G2 are satisfied, but each is preferably $1.0\times10^4$ Pa to $3.5\times10^4$ Pa, more preferably $1.5\times10^4$ Pa to $3.0\times10^4$ Pa, and even more preferably $1.8\times10^4$ Pa to $2.7\times10^4$ Pa. In addition, GB and G2 (preferably G'(120° C.)) are also not particularly limited, but each is preferably $0.5\times10^4$ Pa to $2.5\times10^4$ Pa, more preferably $1.0\times10^4$ Pa to $2.0\times10^4$ Pa, and even more preferably $1.0\times10^4$ Pa to $1.8\times10^4$ Pa. The storage moduli can be controlled by the amount of crosslinking agent and polymerization initiator used in the toners.

Toner Composition and Manufacturing Method

The composition of the toners Ty, Tm, Tc, and Tk, which serve both for printing and for adhesion, will be described. For example, toners Ty, Tm, Tc, and Tk containing a thermoplastic resin as a binder resin can be used. The resin that can be used for the thermoplastic resin is not particularly limited, and examples of which include known thermoplastic resins such as a polyester resin, a vinyl resin, an acrylic resin, a styrene acrylic resin, polyethylene, polypropylene, polyolefin, an ethylene-vinyl acetate copolymer resin, and an ethylene-acrylic acid copolymer resin. A plurality of such resins may be contained.

The toners preferably contain a polyester resin or a vinyl resin.

It is preferable that the styrene acrylic resin includes a styrene acrylic resin such as a styrene-methyl acrylate copolymer, a styrene-ethyl acrylate copolymer, a styrene-butyl acrylate copolymer, a styrene-octyl acrylate copolymer, a styrene-dimethylaminoethyl acrylate copolymer, a styrene-methyl methacrylate copolymer, a styrene-ethyl methacrylate copolymer, a styrene-butyl methacrylate copolymer, or a styrene-dimethylaminoethyl methacrylate copolymer, and more preferably includes a styrene-butyl acrylate copolymer.

As the polyester resin, a condensation product of a carboxylic acid component and an alcohol component listed below can be used. Examples of the carboxylic acid component include a terephthalic acid, an isophthalic acid, a phthalic acid, a fumaric acid, a maleic acid, a cyclohexanedicarboxylic acid, and a trimellitic acid. Examples of the alcohol component include bisphenol A, hydrogenated bisphenol, an ethylene oxide adduct of bisphenol A, a propylene oxide adduct of bisphenol A, glycerin, trimethylolpropane, and pentaerythritol.

The thermoplastic resin may contain a polyester resin in addition to the vinyl resin. The content of vinyl resin in the thermoplastic resin is preferably 50% to 100% by mass, more preferably 80% to 99% by mass, and even more preferably 90% to 98% by mass.

Note that the method for producing the polymer is not particularly limited, and any known method can be used.

It is preferable that the toners Ty, Tm, Tc, and Tk further contain wax. As the wax, a known wax such as an ester wax, which is an ester of alcohol and acid, or a hydrocarbon wax such as paraffin wax, can be used.

The toners Ty, Tm, Tc, and Tk contain colorants. As the colorants, known colorants can be used, such as a yellow colorant for the yellow toner Ty, a magenta colorant for the magenta toner Tm, a cyan colorant for the cyan toner Tc, and a black colorant for the black toner Tk.

The toners Ty, Tm, Tc, and Tk may contain a magnetic material, a charge control agent, a wax, and an external additive. Each toner may have a crosslinked structure. The crosslinked structure is formed from a crosslinking agent having a plurality of vinyl groups such as divinylbenzene. The crosslinking agent is not particularly limited, and any known crosslinking agent may be used. The amount of crosslinker can control the storage modulus of each toner.

In order to form adhesive layers of the toners Ty, Tm, Tc, and Tk on a sheet using an electrophotographic method, it is preferable that the volume average particle diameter of the toners Ty, Tm, Tc, and Tk is preferably from 5.0 μm to 30 μm, more preferably from 6.0 μm to 20 μm.

General printing toners may be used as the toners Ty, Tm, Tc, and Tk as long as adhesive properties are satisfied.

Figure 4A:
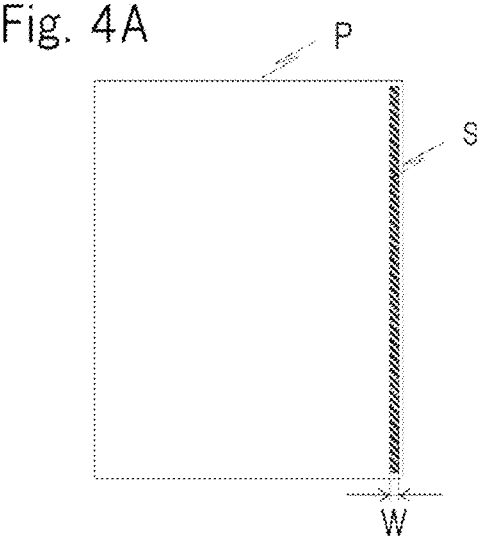
FIGS. 4A and 4B are schematic diagrams showing a printing area of an adhesive part.

FIG. 4A is a schematic diagram showing a printing area S of an adhesive image patterns formed using the toners Ty, Tm, Tc, and Tk in the examples described later. As shown in the shaded area, the printing area S of the adhesive image patterns is formed on a long edge portion of the sheet P, so that a long-edge bound booklet can be produced as a product when a booklet is produced by the post-processing apparatus. In the examples described later, the width W of the printing area S of the adhesive image patterns is 4.0 mm.

Figure 4B:
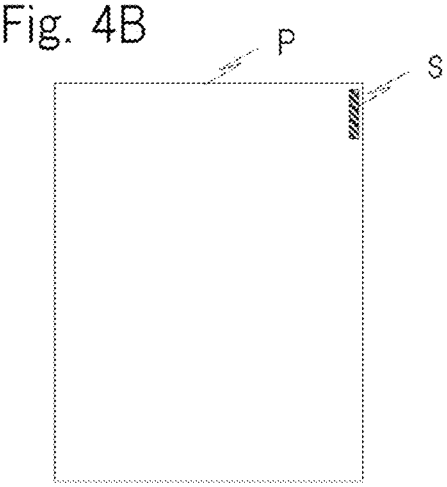

The shape of the printing area S may be changed as appropriate so that a desired booklet can be achieved. As shown in FIG. 4B, by forming the printing area S of the adhesive image patterns on a portion of the long edge portion, it is also possible to produce a corner-bound booklet as a product. In the examples described later, the amount of toner per unit area (bearing amount) of each single color toner used in the adhesive image patterns is 0.4 $mg/cm^2$.

For example, the each toner bearing amount forming the adhesive layer on each sheet is preferably 0.3 $mg/cm^2$ to 1.5 $mg/cm^2$, more preferably 0.4 $mg/cm^2$ to 1.0 $mg/cm^2$. The total toner bearing amount in the adhesive image patterns is preferably 0.8 $mg/cm^2$ to 2.0 $mg/cm^2$, more preferably 1.0 $mg/cm^2$ to 1.5 $mg/cm^2$.

An example of production of the toners Ty, Tm, Tc, and Tk will be described. In the examples, toners manufactured as follows were used. Note that the following colorants were used in the toners.

Toner Ty: C. I. pigment yellow 12
Toner Tm: C. I. pigment red 254
Toner Tc: copper phthalocyanine
Toner Tk: carbon black 75.0 parts of styrene
25.0 parts of n-butyl acrylate
4.0 parts of polyester resin
(polyester resin with a weight-average molecular weight (Mw) of 20000, a glass transition temperature (Tg) of 75° C., and an acid value of 8.2 mgKOH/g (using 2.0 mole adduct of bisphenol A-propylene oxide and terephthalic acid in a 1:1 molar ratio))
6.5 parts of colorant
14.0 parts of ethylene glycol distearate
(an ester wax produced by esterifying ethylene glycol and a stearic acid)
2.0 parts of hydrocarbon wax (HNP-9, manufactured by Nippon Seiro)
0.5 parts of divinylbenzene (crosslinking agent)

The mixture of the above materials was kept at 60° C. and stirred at 500 rpm using a T.K. homo mixer (manufactured by Tokushu Kika Kogyo Co., Ltd.) to uniformly dissolve the mixture, thereby preparing a polymerizable monomer composition.

Meanwhile, 850.0 parts of 0.10 mol/L-$Na_3PO_4$ aqueous solution and 8.0 parts of 10% hydrochloric acid were added to a container equipped with a high-speed stirrer Clearmix (manufactured by M Technique), the rotation speed was adjusted to 15000 rpm, and the temperature was heated to 70° C. 127.5 parts of 1.0 mol/L-$CaCl_2$) aqueous solution was added to this container to prepare an aqueous medium containing a calcium phosphate compound.

After putting the above polymerizable monomer composition into the aqueous medium, 7.0 parts of t-butyl peroxypivalate, which is a polymerization initiator, was added, and the mixture was granulated for 10 minutes while maintaining a rotation speed of 15000 rpm. Thereafter, the stirrer was changed from a high-speed stirrer to a propeller stirring blade, and the mixture was reacted at 70° C. for 5 hours while refluxing, and then the liquid temperature was raised to 85° C., and the reaction was further continued for 2 hours.

After the polymerization reaction was completed, the obtained slurry was cooled, and then hydrochloric acid was added to the slurry to adjust the pH to 1.4, and the calcium phosphate salt was dissolved by stirring for 1 hour. Thereafter, the slurry was washed with three times as much water as the slurry, filtered, dried, and classified to obtain a toner particle.

Thereafter, 2.0 parts of silica fine particles (number average particle diameter of primary particles: 10 nm, BET specific surface area: 170 $m^2/g$) that had been hydrophobized using dimethyl silicone oil (20% by mass) as an external additive were added to 100.0 parts of adhesive toner particle, and the mixture was mixed for 15 minutes at 3000 rpm using a Mitsui Henschel mixer (manufactured by Mitsui Miike Kakoki Co., Ltd.) to obtain the toners Ty, Tm, Tc, and Tk.

The volume average particle diameters of the obtained toners Ty, Tm, Tc, and Tk were all 7.0 μm.

Viscoelastic Properties of Toner

A method for measuring a storage elastic modulus, which indicates the viscoelastic property of toner, will be described. The storage elastic moduli of the toners Ty, Tm, Tc, and Tk are measured using a dynamic viscoelasticity measuring apparatus (rheometer) ARES (manufactured by Rheometric Scientific).

Measurement jig: A serrated parallel plate with a diameter of 7.9 mm is used.

Measurement sample: A pressure molding machine is used to mold a 0.1 g sample into a cylindrical sample with a diameter of 8 mm and a height of 2 mm (the pressure condition is maintained at 15 kN for 1 minute at normal temperature). The pressure molding machine used is a 100 kN press NT-100H manufactured by NPa SYSTEM CO., LTD.

The temperature of the serrated parallel plate is adjusted to 120° C., the cylindrical sample is heated and melted, the saw teeth are bitten into the sample, a load is applied to the sample in the vertical direction so that the axial force does not exceed 30 (gf) (0.294 N), and the sample is fixed on a serrated parallel plate. At this time, a steel belt may be used so that the diameter of the sample is the same as the diameter of the parallel plate. The serrated parallel plate and the cylindrical sample are slowly cooled down to the measurement starting temperature of 30.00° C. over 1 hour.

Measurement frequency: 6.28 rad/s

Measurement distortion setting: the initial value is set to 0.1% and measurement is performed in automatic measurement mode.

Sample elongation correction: adjusted in automatic measurement mode.

Measurement temperature: increased from 30° C. to 140° C. at a rate of 2° C. per minute.

Measurement interval: viscoelastic data is measured every 30 seconds, i.e., every 1° C.

Toners with different storage elastic moduli were prototyped using the above toner manufacturing method, and a toner set A used in Example 1, a toner set B used in Comparative Example 1, and a toner set C used in Comparative Example 2 were obtained. The storage elastic moduli of the toners were changed by adjusting the amount of crosslinking agent in the toner manufacturing method described above as follows.

Toner Set A
- Ty: 0.7 parts
- Tm: 0.6 parts
- Tc: 0.5 parts
- Tk: 0.8 parts

Toner Set B
- Ty: 0.8 parts
- Tm: 0.8 parts
- Tc: 0.8 parts
- Tk: 0.8 parts

Toner Set C
- Ty: 0.5 parts
- Tm: 0.5 parts
- Tc: 0.5 parts
- Tk: 0.5 parts

In the present Examples, when a sheet bundle was subjected to the bonding processing by the thermocompression bonding unit 51, the temperature was set so that the peak temperature of the adhesive image patterns (adhesive layers) was 120° C. when a maximum of five sheets were bonded at one time. More specifically, as shown in FIG. 3A, when P1-1 to P1-5 were subjected to bonding processing at one time, the surface temperature of the heating plate 502 and the set temperature of the temperature detection means were set so that the temperature of the adhesive image patterns (adhesive layers) between P1-4 and P1-5 was 120° C.

The temperature of the adhesive image patterns (adhesive layers) was measured by attaching a thermocouple with a small thermal capacity of the temperature sensing part (for example, the diameter of K type thermocouple wire manufactured by Anritsu Keiki Co., Ltd. is 50 μm or less) to the area corresponding to the printing area S of the adhesive layers between P1-4 and P1-5 in FIG. 3A. The potential difference signal from the thermocouple was measured using a Memory Hicorder manufactured by Hioki Electric Co., Ltd. (temporal resolution set to 0.1 sec), thereby the peak value of the temperature of the adhesive image patterns (adhesive layers) during the bonding operation by the thermocompression bonding unit 51 was obtained. The same measurement was performed five times, and the average value of the three measurements excluding the top and bottom temperatures was used as the peak value of the temperature of the adhesive image patterns (adhesive layers).

It is preferable that the peak value of the temperature of the adhesive image patterns (adhesive layers) is set based on the adhesive properties of the toners. Specifically, it is more preferable that the heating and pressing conditions (heating temperature, pressing force, and pressing time) of the thermocompression bonding unit 51 are set based on the adhesive properties of the toner that is least likely to melt.

Figure 5:
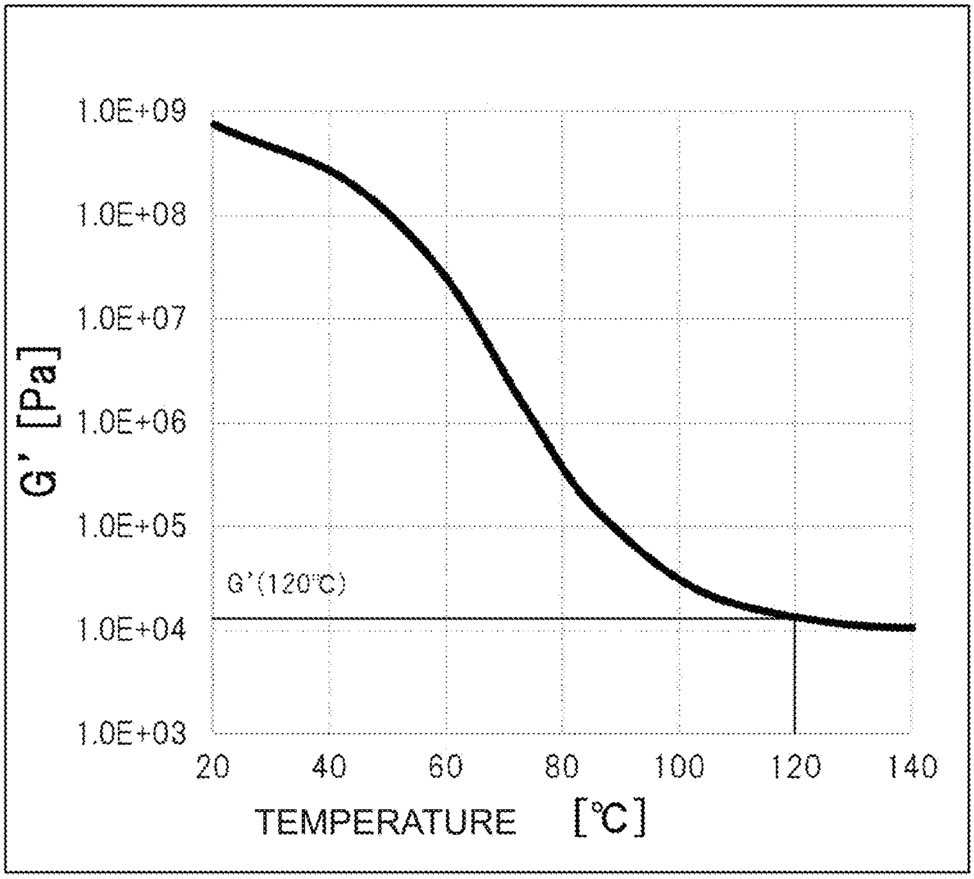
FIG. 5 shows measurement results of toner storage elastic modulus.

FIG. 5 shows examples of measurement results of the toner storage elastic modulus. From the measurement results of the toner viscoelasticity shown in FIG. 5, the storage elastic modulus G'(120° C.) of the toner at 120° C., which corresponds to the peak temperature of the adhesive image patterns (adhesive layers) in the present Examples, can be obtained. In the case of FIG. 5, G'(120° C.)=$1.1\times10^4$ Pa.

Table 1 shows the values of the storage elastic moduli G'(120° C.) of the yellow toner Ty, the magenta toner Tm, the cyan toner Tc, and the black toner Tk included in the toner set A used in Example 1, the toner set B used in Comparative Example 1, and the toner set C used in Comparative Example 2.

TABLE 1

Storage Elastic Moduli G'(120° C.) of Toners

| | Yellow Toner Ty | Magenta Toner Tm | Cyan Toner Tc | Black Toner Tk |
|---|---|---|---|---|
| Toner Set A (Example 1) | $2.0\times10^4$ Pa | $1.6\times10^4$ Pa | $1.1\times10^4$ Pa | $2.5\times10^4$ Pa |
| Toner Set B (Comparative Example 1) | $2.5\times10^4$ Pa | $2.5\times10^4$ Pa | $2.5\times10^4$ Pa | $2.5\times10^4$ Pa |
| Toner Set C (Comparative Example 2) | $1.1\times10^4$ Pa | $1.1\times10^4$ Pa | $1.1\times10^4$ Pa | $1.1\times10^4$ Pa |

In the toner set A used in Example 1, the storage elastic modulus G'(120° C.) of the black toner Tk was set to be the highest. In contrast, in the toner set B used in Comparative Example 1, the storage elastic moduli G'(120° C.) of the four color toners were set to the same value ($2.5\times10^4$ Pa). Similarly, in the toner set C used in Comparative Example 2, the storage elastic moduli G'(120° C.) of the four color toners were set to the same value ($1.1\times10^4$ Pa).

Comparison Test Results Regarding Booklet Bonding Strength

Table 2 shows the results of a comparison test performed using the toner set A, the toner set B, and the toner set C shown in Table 1. Through this comparison test, the relationship between the toners used, the type of the toners used for the adhesive layers, and the bonding strength of the booklet was investigated.

The recording material P used in this measurement was "Vitality Multipurpose Printer Paper (manufactured by Xerox), basis weight 90 g/m$^2$" of the LTR size (279 mm×216 mm).

The method for evaluating the booklet bonding strength will be described using the schematic diagrams in FIGS. 6A and 6B. First, a booklet of five sheets was produced as shown in FIG. 3A, using the image forming apparatus 1 and the thermocompression bonding unit 51 shown in FIG. 1. At this time, the thermocompression bonding unit was used to produce a booklet for strength testing through a one-time heating and pressing processing.

Thereafter, P1-1 to P1-3 were peeled off and removed from the obtained booklet, resulting in a booklet with only two sheets P1-4 and P1-5 bonded together. Thereafter, a test piece E including an adhesive part S was created by cutting it out from the booklet consisting of two sheets P1-4 and P1-5 so as to have dimensions of a width (H) 20 mm and a length (L) 50 mm as shown in FIG. 6A.

Figure 6B:
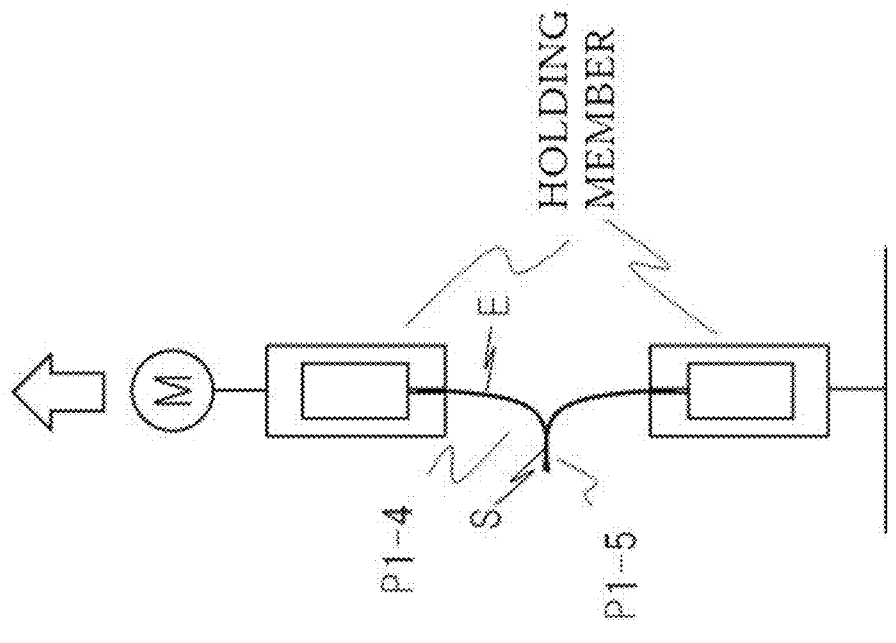
FIGS. 6A and 6B are schematic diagrams showing a method for testing booklet bonding strength.
Figure 6A:
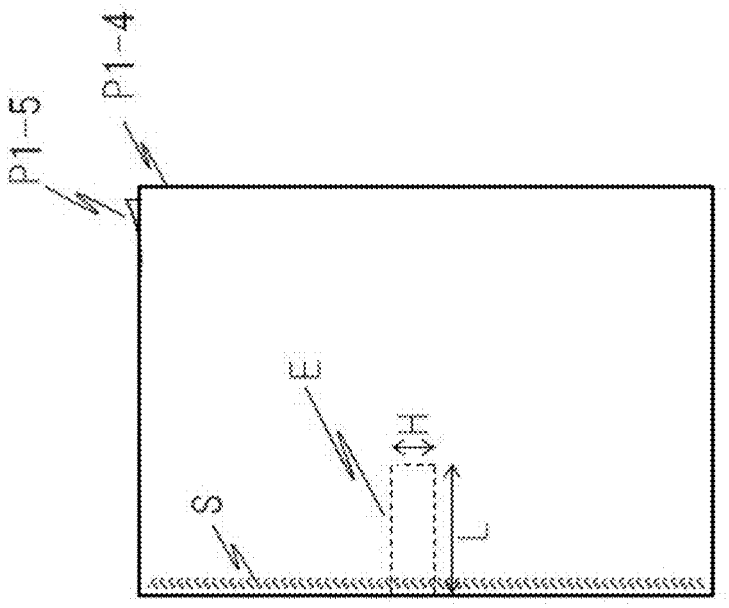

Next, as shown in FIG. 6B, the P1-4 side of this test piece E was held by an upper holding member, and the P1-5 side thereof was held by a lower holding member. Furthermore, a digital force gauge M (FGP-2, manufactured by Nidec-Shimpo Corporation) was connected to the upper holding member. Thereafter, the digital force gauge was gradually pulled upward, and the peeling force when the adhesive part S was peeled off was measured using the digital force gauge, and the peak value of the peeling force was recorded. Note that the measurement was performed five times, and the average value was taken as the booklet bonding strength of the adhesive part S.

The authors confirmed that it is practically desirable for the bonding strength of the booklet to be 1.0 N/cm or more per unit distance in the width direction of the test piece. Therefore, as a quality standard, a booklet strength of 1.0 N/cm or more was determined to be "Pass", and a booklet strength of less than 1.0 N/cm was determined to be "Fail". Here, the reason the authors measured the bonding strength between P1-4 and P1-5 was that the booklet bonding strength is likely to be an issue because the point is farthest from the heating plate compared to other adhesive points and it is difficult to supply heat thereto.

The results of the comparison test regarding the booklet bonding strength performed using the toner set A, the toner set B, and the toner set C shown in Table 1 will be described using Table 2.

order is to be that shown in FIG. 7A. In the case of FIG. 7A, which shows the stacking pattern of the adhesive layers in Example 1 in Table 2, the booklet bonding strength was 1.3 N/cm, and a sufficient bonding strength was ensured for booklet quality.

In FIG. 7B, the black toner Tk and the cyan toner Tc were stacked in the adhesive layers on the front side of the sheet (P1-5 side), and, similarly, the black toner Tk and the cyan toner Tc were stacked in the adhesive layers on the back side of the sheet (P1-4 side). In bonding processing, the stacking order is to be that shown in FIG. 7B. In the case of FIG. 7B, which shows the stacking pattern of the adhesive layers in Example 1 in Table 2, the booklet bonding strength was 1.5 N/cm, and a sufficient bonding strength was ensured for booklet quality.

In FIG. 7C, the black toner Tk, the cyan toner Tc, and the magenta toner Tm were stacked in the adhesive layers on the front side of the sheet (P1-5 side), and the black toner Tk was stacked in the adhesive layers on the back side of the sheet (P1-4 side). In bonding processing, the stacking order is to be that shown in FIG. 7C. In the case of FIG. 7C, which

TABLE 2

Results of Evaluation Regarding Booklet Bonding Strength in Example and Comparative Examples

| | Toners Used | Composition of Adhesive Layers: Stacking Pattern | Composition of Adhesive Layers: Toners Used in Adhesive Layers on Front Side of Sheet | Composition of Adhesive Layers: Toners Used in Adhesive Layers on Back Side of Sheet | Booklet Bonding Strength: Measurement Value | Booklet Bonding Strength: Quality Judgment |
|---|---|---|---|---|---|---|
| Example 1 | Toner Set A | FIG. 7A | Black, Cyan | Black | 1.3 N/cm | Pass |
| | | FIG. 7B | Black, Cyan | Black, Cyan | 1.5 N/cm | Pass |
| | | FIG. 7C | Black, Cyan, Magenta | Black | 1.5 N/cm | Pass |
| Comparative Example 1 | Toner Set B | FIG. 7A | Black, Cyan | Black | 0.5 N/cm | Fail |
| | | FIG. 7B | Black, Cyan | Black, Cyan | 0.7 N/cm | Fail |
| | | FIG. 7C | Black, Cyan, Magenta | Black | 0.7 N/cm | Fail |
| Comparative Example 2 | Toner Set C | FIG. 7A | Black, Cyan | Black | 0.4 N/cm | Fail |
| | | FIG. 7B | Black, Cyan | Black, Cyan | 0.7 N/cm | Fail |
| | | FIG. 7C | Black, Cyan, Magenta | Black | 0.7 N/cm | Fail |

Example 1

In Example 1, the toner set A shown in Table 1 was used. The stacking pattern of the toners used in the adhesive layers will be described using FIGS. 7A to 7C. The adhesive layers were formed on the sheet in the order of toners shown in Table 2. For example, "Black, Cyan" indicates that a sheet, an adhesive layer of the black toner, and an adhesive layer of the cyan toner were formed in this order. "Black, Cyan, Magenta" indicates that a sheet, an adhesive layer of the black toner, an adhesive layer of the cyan toner, and an adhesive layer of the magenta toner were formed in this order.

In FIG. 7A, the black toner Tk and the cyan toner Tc were stacked in the adhesive layers on the front side (P1-5 side) of the sheet (i.e., one of the two sheets facing each other), and only the black toner Tk was stacked in the back side (P1-4 side) of the sheet (i.e., the other of the two sheets facing each other).

As shown in FIG. 3A, in bonding processing, the adhesive layer on the front side of the sheet and the adhesive layer on the back side of the sheet face each other, so the stacking shows the stacking pattern of the adhesive layers in Example 1 in Table 2, the booklet bonding strength was 1.5 N/cm, and a sufficient bonding strength was ensured for booklet quality.

Comparative Example 1

In Comparative Example 1, the toner set B shown in Table 1 was used. Description of the stacking pattern of the toners used in the adhesive layers will be omitted because the same FIGS. 7A to 7C as in Example 1 in Table 2 described above were used.

In the case of FIG. 7A, which shows the stacking pattern of the adhesive layers in Comparative Example 1 in Table 2, the booklet bonding strength was 0.5 N/cm, and this bonding strength was not sufficient for booklet quality. Similarly, in the cases of FIGS. 7B and 7C, which show the stacking patterns of the adhesive layers in Comparative Example 1 in Table 2, the booklet bonding strength was 0.7 N/cm, and this bonding strength was not sufficient for booklet quality.

Comparative Example 2

In Comparative Example 2, the toner set C shown in Table 1 was used. Description of the stacking pattern of the toners used in the adhesive layers will be omitted because the same FIGS. 7A to 7C as in Example 1 in Table 2 described above were used.

In the case of FIG. 7A, which shows the stacking pattern of the adhesive layers in Comparative Example 2 in Table 2, the booklet bonding strength was 0.4 N/cm, and this bonding strength was not sufficient for booklet quality. Similarly, in the cases of FIGS. 7B and 7C, which show the stacking patterns of the adhesive layers in Comparative Example 2 in Table 2, the booklet bonding strength was 0.7 N/cm, and this bonding strength was not sufficient for booklet quality.

Mechanism of Developing Booklet Bonding Strength

Sufficient booklet bonding strength was ensured in Example 1 in Table 2, whereas the booklet bonding strength was insufficient in Comparative Example 1 and Comparative Example 2 in Table 2. The mechanism by which the differences between these three examples develop will be described using the schematic diagrams in FIGS. 8A, 8B, and 8C.

FIG. 8A schematically shows the cross-sectional state of the toners after the bonding processing in FIG. 7A, which shows the stacking pattern of the adhesive layers in Example 1 in Table 2. Referring to the toner set A in Table 1 used in Example 1, the storage modulus G'(120° C.) of the black toner Tk in FIG. 8A, which forms the adhesive layer adjacent to the sheets P1-5 and P1-4, is higher than that of the toners of other colors in the toner set A.

Normally, the temperature and pressure during bonding processing are often set to ensure the adhesive properties of the toner that is least likely to melt. For example, in the case of the toner set A, the black toner Tk with the highest storage modulus G'(120° C.) is the standard. In such a case, as shown in FIG. 8A, the black toner Tk does not penetrate the sheet, and the thickness of the adhesive layer can be ensured. In the case of this example, the thicker the adhesive layer is, the better the booklet bonding strength can be achieved.

In addition, in the case of the toner set A, the storage elastic modulus G'(120° C.) of the cyan toner Tc interposed is lower than the storage elastic modulus G'(120° C.) of the black toner. In such a case, since the cyan toner Tc is easily melted and deformed, it easily follows the surface shape of the black toner Tk. That is to say, voids can be reduced at the interface between the adhesive layers of toners, and cohesive failure at the interface of the adhesive layers can be suppressed. In Example 1, it is believed that desirable booklet bonding strength was achieved by adjusting the viscoelastic properties between the toners.

In FIGS. 7B and 7C, which show the stacking patterns of the adhesive layers in Example 1 in Table 2, it is believed that desirable booklet bonding strength was achieved by a similar mechanism. It is believed that in FIGS. 7B and 7C, the booklet bonding strength is slightly higher than that in FIG. 7A because the total toner bearing amount in the adhesive layers is larger.

FIG. 8B schematically shows the cross-sectional state of the toners after the bonding processing in FIG. 7A, which shows the stacking pattern of the adhesive layers in Comparative Example 1 in Table 2. The storage elastic modulus G'(120° C.) of the toner set B in Comparative Example 1 shown in Table 1 was the same for all of the four colors (Ty, Tm, Tc, and Tk) as described above, and was adjusted to be equivalent to Tk, which has the highest storage elastic modulus G' in the toner set A. The temperature and pressure during bonding processing and fixing processing for the toner set B were set to be equivalent to those for the toner set A in Example 1.

As shown in FIG. 8B, since the black toner Tk is adjusted to have the same storage elastic modulus G'(120° C.) as in Example 1, it does not penetrate the sheet and the thickness of the adhesive layer can be secured. On the other hand, the storage elastic modulus G'(120° C.) of the interposed cyan toner Tc is also as high as the storage elastic modulus G'(120° C.) of the black toner.

In such a case, since the cyan toner Tc is less likely to be melted and deformed, it is less likely to follow the surface shape of the black toner Tk. That is to say, the number of voids increases at the interface between the adhesive layers of toners, and cohesive failure is likely to occur at the interface between the adhesive layers, resulting in a decrease in booklet bonding strength. In the case of FIG. 7A, which shows the stacking pattern of the adhesive layers in Comparative Example 1 in Table 2, it is believed that booklet bonding strength was insufficient as a result of these effects.

In the cases of FIGS. 7B and 7C, which show the stacking pattern of the adhesive layers in Comparative Example 1 in Table 2, it is believed that booklet bonding strength decreased due to a similar mechanism.

FIG. 8C schematically shows the cross-sectional state of the toners after the bonding processing in FIG. 7A, which shows the stacking pattern of the adhesive layers in Comparative Example 2 in Table 2. The storage elastic modulus G'(120° C.) of the toner set C in Comparative Example 2 shown in Table 1 was the same for all of the four colors (Ty, Tm, Tc, and Tk) as described above, and was adjusted to be equivalent to Tc, which has the lowest storage elastic modulus G' in the toner set A. The temperature and pressure during bonding processing and fixing processing for the toner set C were set to be equivalent to those for the toner set A in Example 1.

As shown in FIG. 8C, since the black toner Tk is adjusted to have a lower storage modulus G'(120° C.) than that in Example 1, it easily permeates into the sheet. Particularly, pressure is easily applied to protruding portions of the sheet during bonding processing and fixing processing, so the toner permeates into the sheet more noticeably, reducing the thickness of the adhesive layer. As the thickness of the adhesive layer becomes thinner, localized areas where the adhesive layer is not present, such as paper protrusions, tend to occur. That is to say, as the adhesive area between the sheet and the adhesive layer decreases, the sheet peels off easily, and booklet bonding strength decreases.

It is believed that in the case of FIG. 7A, which shows the stacking pattern of the adhesive layers in Comparative Example 2 in Table 2, booklet bonding strength was insufficient as a result of these effects. In the cases of FIGS. 7B and 7C, which show the stacking pattern of the adhesive layers in Comparative Example 2 in Table 2, it is believed that booklet bonding strength decreased due to a similar mechanism.

As described above, in the present disclosure, when forming adhesive layers using a plurality of toners, the storage elastic modulus of toners adjacent to a sheet is made higher than the storage elastic modulus of toners not adjacent to a sheet. That is to say, by selecting the toners used for the adhesive image patterns so as to satisfy the above-mentioned GA>GB, G1>G2, and G3>G2, it is possible to achieve desirable booklet bonding strength.

Here, in Example 1 in Table 2, the type of toner used in the adhesive layers is specified, but if the storage elastic modulus of the toners adjacent to the sheet is higher than the storage elastic modulus of the toners not adjacent to the sheet, desirable booklet bonding strength can be achieved. This is because, as mentioned above, the temperature and pressure settings during bonding processing are usually determined based on the adhesive properties of the toner that is least likely to melt.

For example, in FIGS. 7A and 7B, which show the stacking pattern of the adhesive layers in Example 1 in Table 2, the magenta toner Tm or the yellow toner Ty may be used instead of the cyan toner Tc. Furthermore, in FIG. 7C, which shows the stacking pattern, the toner type and the number of toner layers of the cyan toner Tc and the magenta toner Tm sandwiched between the black toners Tk may be changed. In the toner set A in Table 1, the storage elastic modulus of the black toner Tk is higher than that of other toners, so toners that can be stacked between the black toners Tk can be freely selected from the combinations the cyan toner Tc, the magenta toner Tm, and the yellow toner Ty, and desirable booklet bonding strength can be achieved in all of the cases.

Figure 9:
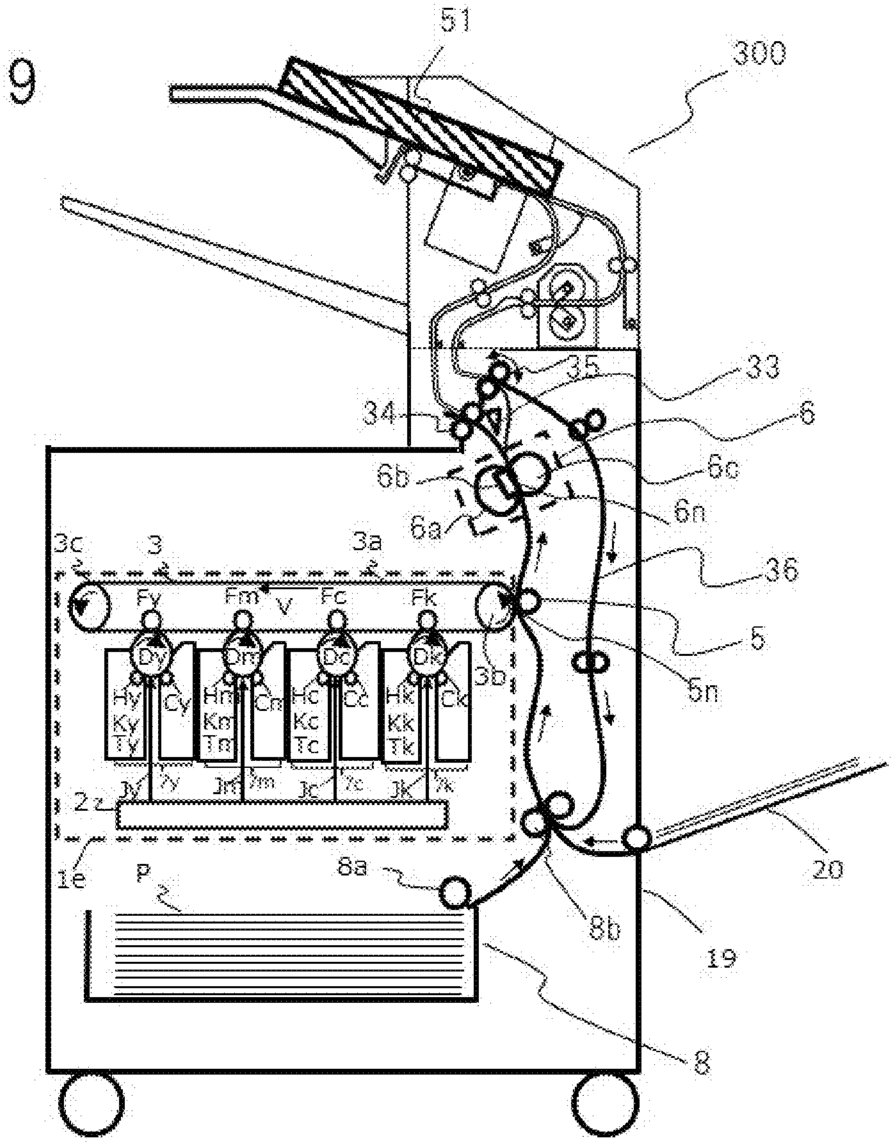
FIG. 9 is a cross-sectional view showing a configuration of a modified example of the image forming apparatus.

In the present Example, the post-processing apparatus including the thermocompression bonding unit is arranged side by side with the image forming apparatus 1, but the present invention is not limited to such a configuration. For example, as shown in FIG. 9, the thermocompression bonding unit 51 may be disposed on top of the main body of the image forming apparatus.

Example 2

Example 2 shows that an image forming apparatus that is capable of achieving desirable booklet bonding strength is provided even if the types of toners adjacent to each other on the front side of the sheet and the toners adjacent to each other on the back side of the sheet are different after booklet bonding. By changing the types of toners used, it is possible to suppress an increase in the amount of consumption of a specific toner. In addition, depending on the stacking pattern of the toners used in the adhesive layers, it is possible to achieve desirable booklet bonding strength even in single-sided printing, and booklet productivity can be improved.

Note that the basic configuration and operation of the image forming apparatus and the post-processing apparatus in the present Example are the same as those of the image forming apparatus and the post-processing apparatus in Example 1 described above. Therefore, in the image forming apparatus and the post-processing apparatus in the present Example, the elements having the same or corresponding functions or configurations as those of the image forming apparatus and the post-processing apparatus in Example 1 are given the same reference numerals as those in Example 1 and the detailed descriptions thereof are omitted.

The booklet bonding strength in Example 2 will be described using Table 3.

In Example 2, the same toner set A shown in Table 1 was used as in Example 1. The stacking pattern of the toners used in the adhesive layers will be described using FIGS. 10A to 10C.

In FIG. 10A, the black toner Tk and the cyan toner Tc were stacked in the adhesive layers on the front side of the sheet (P1-5 side), and only the yellow toner Ty was stacked in the adhesive layers on the back side of the sheet (P1-4 side). In the case of FIG. 10A, which shows the stacking pattern of the adhesive layers in Example 2 in Table 3, the booklet bonding strength was 1.2 N/cm, and a sufficient bonding strength was ensured for booklet quality.

Referring to the toner set A in Table 1, the storage elastic moduli G'(120° C.) of the black toner Tk adjacent to the sheet P1-5 and the yellow toner Ty adjacent to the sheet P1-4 in FIG. 10A are higher than the storage modulus G'(120° C.) of the cyan toner Tc interposed therebetween. Therefore, it is believed that desirable booklet bonding strength can be achieved for the same reason as the adhesive mechanism described using FIGS. 8A to 8C. Furthermore, compared to the stacking pattern in Example 1 shown in FIG. 7A, the consumption amount of the black toner Tk is suppressed by an amount corresponding to one use, so that an increase in the consumption amount of a specific toner can be suppressed.

In FIG. 10B, the stacking order of the adhesive layers is the same as in FIG. 10A, but the adhesive layers are formed only on the front side of the sheet by one-sided printing. By not printing on both sides, booklet productivity can be improved. The black toner Tk, the cyan toner Tc, and the yellow toner Ty are stacked in the adhesive layers on the front side of the sheet (P1-5 side), and no adhesive layer is provided on the back side of the sheet (P1-4 side).

In bonding processing, the stacking order in the adhesive image patterns is to be that shown in FIG. 10B. In the case of FIG. 10B, which shows the stacking pattern of the adhesive layers in Example 2 in Table 3, the booklet bonding strength was 1.2 N/cm, and a sufficient bonding strength was ensured for booklet quality. FIGS. 10A and 10B show the adhesive image patterns having the same toner layer configuration, which results in the same booklet bonding strength.

In FIG. 10C, the black toner Tk, the cyan toner Tc, the magenta toner Tm, and the yellow toner Ty are all stacked in the adhesive layers on the front side of the sheet (P1-5 side), and no adhesive layers are provided on the back side of the sheet (P1-4 side). In bonding processing, the stacking order is to be that shown in FIG. 10C. In the case of FIG. 10C, which shows the stacking pattern of the adhesive layers

TABLE 3

Evaluation Result Regarding Booklet Bonding Strength in Example 2

| | Toners Used | Stacking Pattern | Composition of Adhesive Layers: Toners Used in Adhesive Layers on Front Side of Sheet | Composition of Adhesive Layers: Toners Used in Adhesive Layers on Back Side of Sheet | Booklet Bonding Strength: Measurement Value | Booklet Bonding Strength: Quality Judgment |
|---|---|---|---|---|---|---|
| Example 2 | Toner Set A | FIG. 10A | Black, Cyan | Yellow | 1.2 N/cm | Pass |
| | | FIG. 10B | Black, Cyan, Yellow | None (One-sided Printing) | 1.2 N/cm | Pass |
| | | FIG. 10C | Black, Cyan, Magenta, Yellow | None (One-sided Printing) | 1.3 N/cm | Pass |

in Example 2 in Table 3, the booklet bonding strength was 1.3 N/cm, and a sufficient bonding strength was ensured for booklet quality. In the case of FIG. 10C, the booklet bonding strength is slightly higher than that in FIG. 10B because the total toner bearing amount in the adhesive layers is larger.

As described above, according to the present Example, when forming adhesive toner layers using a plurality of toners, it is possible to achieve desirable booklet bonding strength while suppressing the consumption of a specific toner.

Here, in Example 2 in Table 3, the type of toner used in the adhesive layers is specified, but, as in Example 1, if the storage elastic modulus of the toners adjacent to the sheet is higher than the storage elastic modulus of the toners not adjacent to the sheet, desirable booklet bonding strength can be achieved.

In Example 2, as in Example 1, as shown in FIG. 9, the thermocompression bonding unit 51 may be disposed on top of the main body of the image forming apparatus.

In Examples 1 and 2, the toner bearing amount may be changed depending on the number and types of toners used in the adhesive layers. For example, the amount of toner consumed can be reduced by reducing the toner bearing amount within a range that maintains the booklet quality regarding bonding strength. The preferred range of the toner bearing amount is as described above.

At this time, a bonding condition (temperature setting, pressure setting, pressure time) for the post-processing apparatus may be changed depending on the toner bearing amount to the adhesive layers. That is to say, the bonding condition is at least one selected from the group consisting of temperature setting, pressure setting, and pressure time. For example, if the toner bearing amount is small, the temperature setting may be lowered, the pressure setting may be lowered, or the pressure time may be reduced. Further improvement in booklet quality can be expected by optimizing the bonding condition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-106857, filed Jun. 29, 2023 which is hereby incorporated by reference herein in its entirety.

What is claimed is:

1. An image forming apparatus at least comprising:

first image forming means for forming a first adhesive layer of a first toner on a sheet; and second image forming means for forming a second adhesive layer of a second toner on the first adhesive layer, wherein adhesive image patterns are formed from the first adhesive layer and the second adhesive layer, wherein the image forming apparatus further comprising booklet bonding means for stacking a plurality of sheets to form a sheet bundle, and applying heat and pressure to the sheet bundle so that the sheets are bonded to each other with the adhesive image patterns interposed therebetween, to form a booklet, wherein at least both the first adhesive layer and the second adhesive layer are formed on one of a first sheet and a second sheet that face each other in the sheet bundle, wherein at least the first adhesive layer is formed on the other of the first sheet and the second sheet, wherein G1>G2 is satisfied, where G1 denotes a storage elastic modulus of the first toner forming the first adhesive layer, and G2 denotes a storage elastic modulus of the second toner forming the second adhesive layer, and wherein a temperature at which G1 and G2 are measured is a peak temperature of the adhesive image patterns during operation of the booklet bonding means.

2. The image forming apparatus according to claim 1, wherein a temperature at which G1 and G2 are measured is 120° C.

3. The image forming apparatus according to claim 1, wherein the first toner is a black toner.

4. The image forming apparatus according to claim 3, wherein the second toner is at least one toner selected from the group consisting of a yellow toner, magenta toner, and a cyan toner.

5. The image forming apparatus according to claim 1, wherein a total toner bearing amount in the adhesive image patterns is 0.8 $mg/cm^2$ to 2.0 $mg/cm^2$.

6. The image forming apparatus according to claim 5, wherein a bonding condition for the booklet bonding means is changed depending on the total toner bearing amount.

7. The image forming apparatus according to claim 6, wherein the bonding condition is at least one selected from among temperature setting, pressure setting, and pressure time.

8. An image forming apparatus at least comprising:

first image forming means for forming a first adhesive layer of a first toner on a sheet;

second image forming means for forming a second adhesive layer of a second toner on the first adhesive layer; and third image forming means for forming a third adhesive layer of a third toner on the second adhesive layer, wherein adhesive image patterns are formed from the first adhesive layer, the second adhesive layer, and the third adhesive layer, wherein the image forming apparatus further comprising booklet bonding means for stacking a plurality of sheets to form a sheet bundle, and applying heat and pressure to the sheet bundle so that the sheets are bonded to each other with the adhesive image patterns interposed therebetween, to form a booklet, wherein both the first adhesive layer and the second adhesive layer are formed on one of a first sheet and a second sheet that face each other in the sheet bundle, wherein at least the third adhesive layer is formed on the other of the first sheet and the second sheet, wherein G1>G2 and G3>G2 are satisfied, where G1 denotes a storage elastic modulus of the first toner forming the first adhesive layer, and G2 denotes a storage elastic modulus of the second toner forming the second adhesive layer, and G3 denotes a storage elastic modulus of the third toner forming the third adhesive layer, and wherein a temperature at which G1, G2 and G3 are measured is a peak temperature of the adhesive image patterns during operation of the booklet bonding means.

9. The image forming apparatus according to claim 8, wherein the first toner is a black toner.

10. The image forming apparatus according to claim 9, wherein the second toner is at least one toner selected from the group consisting of a magenta toner and a cyan toner.

11. The image forming apparatus according to claim 10, wherein the third toner is a yellow toner.

12. An image forming apparatus comprising:

first image forming means for forming a first adhesive layer of a first toner on a sheet;

second image forming means for forming a second adhesive layer of a second toner on the first adhesive layer;

third image forming means for forming a third adhesive layer of a third toner on the second adhesive layer; and fourth image forming means for forming a fourth adhesive layer of a fourth toner on the third adhesive layer, wherein adhesive image patterns are formed from at least three adhesive layers of the first adhesive layer, the second adhesive layer, the third adhesive layer, and the fourth adhesive layer, wherein the image forming apparatus further comprising booklet bonding means for stacking a plurality of sheets to form a sheet bundle, and applying heat and pressure to the sheet bundle so that the sheets are bonded to each other with the adhesive image patterns interposed therebetween, to form a booklet, wherein all of the adhesive image patterns are formed on one of a first sheet and a second sheet that face each other in the sheet bundle, and wherein GA>GB is satisfied, where GA denotes a storage elastic modulus of a toner forming an adhesive layer A that is in contact with a sheet, from among the at least three adhesive layers forming the adhesive image patterns in the sheet bundle, and GB denotes a storage elastic modulus of a toner forming an adhesive layer B other than the adhesive layer A.

13. The image forming apparatus according to claim 12, wherein the first toner is a black toner, the second toner is one of a magenta toner and a cyan toner, the third toner is the other of the magenta toner and the cyan toner, and the fourth toner is a yellow toner.

14. An image forming apparatus comprising:

image forming means for forming adhesive image patterns that include adhesive layers of toner on sheets; and booklet bonding means for stacking a plurality of sheets on which the adhesive image patterns are formed to form a sheet bundle and bonding the sheets to each other with the adhesive image patterns interposed therebetween by applying heat and pressure to the sheet bundle, to form a booklet, wherein the adhesive image patterns include at least three adhesive layers of toner, wherein the at least three adhesive layers are each formed of a different toner, and wherein GA>GB is satisfied, where GA denotes a storage elastic modulus of a toner forming an adhesive layer A that is in contact with a sheet, from among the at least three adhesive layers forming the adhesive image patterns in the sheet bundle, and GB denotes a storage elastic modulus of a toner forming an adhesive layer B other than the adhesive layer A.

15. A booklet producing method comprising:

forming adhesive image patterns that include adhesive layers of toner on sheets by using image forming means; and stacking the plurality of sheets on which the adhesive image patterns are formed to form a sheet bundle and bonding the sheets to each other with the adhesive image patterns interposed therebetween by applying heat and pressure to the sheet bundle, to form a booklet, wherein, in the adhesive image patterns, at least three adhesive layers of toner are formed, wherein the at least three adhesive layers are each formed of a different toner, and wherein GA>GB is satisfied, where GA denotes a storage elastic modulus of a toner forming an adhesive layer A that is in contact with a sheet, from among the at least three adhesive layers forming the adhesive image patterns in the sheet bundle, and GB denotes a storage elastic modulus of a toner forming an adhesive layer B other than the adhesive layer A.

* * * * *